US011188758B2

(12) United States Patent
Lee et al.

(10) Patent No.: US 11,188,758 B2
(45) Date of Patent: Nov. 30, 2021

(54) TRACKING SEQUENCES OF EVENTS

(71) Applicant: Scenera, Inc., Palo Alto, CA (US)

(72) Inventors: David D. Lee, Palo Alto, CA (US); Andrew Augustine Wajs, Haarlem (NL)

(73) Assignee: Scenera, Inc., Palo Alto, CA (US)

( * ) Notice: Subject to any disclaimer, the term of this patent is extended or adjusted under 35 U.S.C. 154(b) by 0 days.

(21) Appl. No.: 17/084,429

(22) Filed: Oct. 29, 2020

(65) Prior Publication Data

US 2021/0133456 A1    May 6, 2021

Related U.S. Application Data

(60) Provisional application No. 63/020,521, filed on May 5, 2020, provisional application No. 62/928,165, filed on Oct. 30, 2019.

(51) Int. Cl.
*G06K 9/00* (2006.01)
*G06N 5/02* (2006.01)
*G06K 9/62* (2006.01)

(52) U.S. Cl.
CPC ..... *G06K 9/00718* (2013.01); *G06K 9/00771* (2013.01); *G06K 9/6217* (2013.01); *G06N 5/02* (2013.01); *G06K 2009/00738* (2013.01)

(58) Field of Classification Search
None
See application file for complete search history.

(56) References Cited

U.S. PATENT DOCUMENTS

| 10,509,459 | B2 | 12/2019 | Lee et al. |
| 2005/0120330 | A1 | 6/2005 | Ghai et al. |
| 2008/0028363 | A1 | 1/2008 | Mathew |
| 2010/0185973 | A1 | 7/2010 | Ali et al. |
| 2010/0207762 | A1* | 8/2010 | Lee ................. G06K 9/00771 340/541 |
| 2011/0173328 | A1 | 7/2011 | Park et al. |
| 2013/0055201 | A1 | 2/2013 | No et al. |

(Continued)

OTHER PUBLICATIONS

Girdhar, R. et al., "Video Action Transformer Network," Proceedings of the IEEE/CVF Conference on Computer Vision and Pattern Recognition (CVPR), Jun. 2019, pp. 244-253.

(Continued)

*Primary Examiner* — David Perlman
(74) *Attorney, Agent, or Firm* — Fenwick & West LLP

(57) ABSTRACT

A multi-layer technology stack includes a sensor layer including image sensors, a device layer, and a cloud layer, with interfaces between the layers. Each layer contains multiple nodes. A method to develop contextual understanding of related events detected by the nodes includes the following. Sensor nodes capture sensor data, including multiple image sensors capturing images. Various nodes receive sensor data and/or metadata packages from other nodes, analyze the received data for events, and generate and/or augment metadata packages describing the detected events. The analysis includes image understanding. Events that are related are identified, based on the metadata packages describing the events. A contextual understanding of the related events is developed, based on analysis of the metadata packages describing the events.

20 Claims, 40 Drawing Sheets
(40 of 40 Drawing Sheet(s) Filed in Color)

(56) References Cited

U.S. PATENT DOCUMENTS

| | | | |
|---|---|---|---|
| 2013/0124807 A1 | 5/2013 | Nielsen et al. | |
| 2014/0201707 A1 | 7/2014 | Schroeder | |
| 2014/0350997 A1 | 11/2014 | Holm et al. | |
| 2016/0004390 A1* | 1/2016 | Laska | G06F 3/04855 |
| | | | 715/723 |
| 2017/0006135 A1 | 1/2017 | Siebel et al. | |
| 2017/0316586 A1 | 11/2017 | Ricci | |
| 2017/0336858 A1 | 11/2017 | Lee et al. | |
| 2017/0337425 A1 | 11/2017 | Lee et al. | |
| 2018/0018508 A1* | 1/2018 | Tusch | G06K 9/00771 |
| 2019/0043201 A1 | 2/2019 | Strong et al. | |
| 2019/0207866 A1 | 7/2019 | Pathak et al. | |
| 2019/0258864 A1 | 8/2019 | Lee et al. | |
| 2020/0293803 A1 | 9/2020 | Wajs et al. | |

OTHER PUBLICATIONS

Horev, R., "BERT Explained: State of the art language model for NLP," Nov. 10, 2018, 8 pages, [Online] [Retrieved on Jan. 21, 2021] Retrieved from the Internet <URL: https://towardsdatascience.com/bert-explained-state-of-the-art-language-model-for-nlp-f8b21a9b6270>.

Kong, Y. et al., "Human Action Recognition and Prediction: A Survey," arXiv:1806.11230, Jul. 2, 2018, pp. 1-20.

Loginova, K., "Attention in NLP," Jun. 22, 2018, 16 pages, [Online] [Retrieved on Jan. 20, 2021] Retrieved from the Internet <URL: https://medium.com/@edloginova/attention-in-nlp-734c6fa9d983>.

Olah, C. et al., "Attention and Augmented Recurrent Neural Networks," Sep. 8, 2016, 19 pages, [Online] [Retrieved on Jan. 21, 2021] Retrieved from the Internet <URL https://distill.pub/2016/augmented-rnns/>.

Olah, C., "Understanding LSTM Networks," Aug. 27, 2015, eight pages, [Online] [Retrieved on Jan. 20, 2021] Retrieved from the Internet <URL: https://colah.github.io/posts/2015-08-Understanding-LSTMs/>.

Piergiovanni, A.J. et al., "Tiny Video Networks," arXiv: 1910.06961, Oct. 15, 2019, pp. 1-10.

Rivera-Soto, R.A. et al., "Sequence to Sequence Models for Generating Video Captions," Stanford University, Jul. 2, 2017, pp. 1-7.

Rosset, C., "Turing-NLG: A 17-billion-parameter language model by Microsoft," Feb. 13, 2020, 11 pages, [Online] [Retrieved on Jan. 21, 2021] Retrieved from the Internet <URL: https://www.microsoft.com/en-US/research/blog/turing-nlg-a-17-billion-parameter-language-model-by-microsoft/>.

Security World Market, "Androvideo's AI camera for security & safety," Nov. 14, 2019, six pages, [Online] [Retrieved on Jan. 21, 2021] Retrieved from the Internet <URL: https://www.securityworldmarket.com/int/News/Product-News/androvideos-ai-camera-ideal-for-property-security-safety>.

Sharma, A.K., "Predicting Human Behaviour Activity using Deep Learning (LSTM)," May 26, 2018, 12 pages, [Online] [Retrieved on Jan. 21, 2021] Retrieved from the Internet <URL: https://medium.com/@chataks93/predicting-human-behaviour-activity-using-deep-learning-lstm-fff9030b82e7>.

Sun, C. et al., "VideoBERT: A Joint Model for Video and Language Representation Learning," arXiv:1904.01766, Sep. 11, 2019, pp. 1-13.

Vincent, J., "This Japanese AI security camera shows the future of surveillance will be automated," Jun. 26, 2018, four pages, [Online] [Retrieved on Jan. 21, 2021] Retrieved from the Internet <URL: https://www.theverge.com/2018/6/26/17479068/ai-guardman-security-camera-shoplifter-japan-automated-surveillance>.

PCT International Search Report and Written Opinion, PCT Application No. PCT/US20/58198, dated Feb. 2, 2021, 12 pages.

PCT International Search Report and Written Opinion, PCT Application No. PCT/US20/58193, dated Feb. 2, 2021, 14 pages.

* cited by examiner

| Processing Power | Model Size | Typical Networks | Frame Rate |
|---|---|---|---|
| Unlimited | Unlimited | Full CNN and NLP Inference & Training | Unlimited |
| Up to 10 TFlops | >100 MBytes | Full CNN and Small to Medium NLP Inference Only | 25 FPS |
| 1 TFlops | 10 MBytes | Compact CNN Inference Only (Reduced Network Size with Lower Accuracy) | 25 FPS |

Cloud
Data Center
Accelerators

Device
Application Processor
Co Processor
GPU

Sensor
Smart Sensor

FIG. 7

TRACKING SEQUENCES OF EVENTS

CROSS-REFERENCE TO RELATED APPLICATION(S)

This application claims priority under 35 U.S.C. § 119(e) to U.S. Provisional Patent Applications Ser. Nos. 62/928,165, "Network of Intelligent Camera Ecosystem," filed Oct. 30, 2019; and 63/020,521, "NICE Tracking Sequence of Events," filed May 5, 2020. The subject matter of all of the foregoing is incorporated herein by reference in their entirety.

BACKGROUND

1. Technical Field

This disclosure relates generally to obtaining, analyzing and presenting information from sensors, including cameras.

2. Description of Related Art

Millions of cameras and other sensor devices are deployed today. There generally is no mechanism to enable computing to easily interact in a meaningful way with content captured by cameras. This results in most data from cameras not being processed in real time and, at best, captured images are used for forensic purposes after an event has been known to have occurred. As a result, a large amount of data storage is wasted to store video that in the end analysis is not interesting. In addition, human monitoring is usually required to make sense of captured videos. There is limited machine assistance available to interpret or detect relevant data in images.

Another problem today is that the processing of information is highly application specific. Applications such as advanced driver assisted systems and security based on facial recognition require custom built software which reads in raw images from cameras and then processes the raw images in a specific way for the target application. The application developers typically must create application-specific software to process the raw video frames to extract the desired information. In addition to the low-level camera interfaces, if application developers want to use more sophisticated processing or analysis capabilities, such as artificial intelligence or machine learning for higher-level image understanding, they will also have to understand and create interfaces for each of these systems. The application-specific software typically is a full stack beginning with low-level interfaces to the sensors and progressing through different levels of analysis to the final desired results. The current situation also makes it difficult for applications to share or build on the analysis performed by other applications.

As a result, the development of applications that make use of networks of sensors is both slow and limited. For example, surveillance cameras installed in an environment typically are used only for security purposes and in a very limited way. This is in part because the image frames that are captured by such systems are very difficult to extract meaningful data from. Similarly, in an automotive environment where there is a network of cameras mounted on a car, the image data captured from these cameras is processed in a way that is very specific to a feature of the car. For example, a forward-facing camera may be used only for lane assist. There usually is no capability to enable an application to utilize the data or video for other purposes.

Thus, there is a need for more flexibility and ease in accessing and processing data captured by sensors, including images and video captured by cameras.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Embodiments of the disclosure have other advantages and features which will be more readily apparent from the following detailed description and the appended claims, when taken in conjunction with the examples in the accompanying drawings, in which:

FIG. 7 shows computing power available at different layers.

DETAILED DESCRIPTION OF THE PREFERRED EMBODIMENTS

Figure 1:
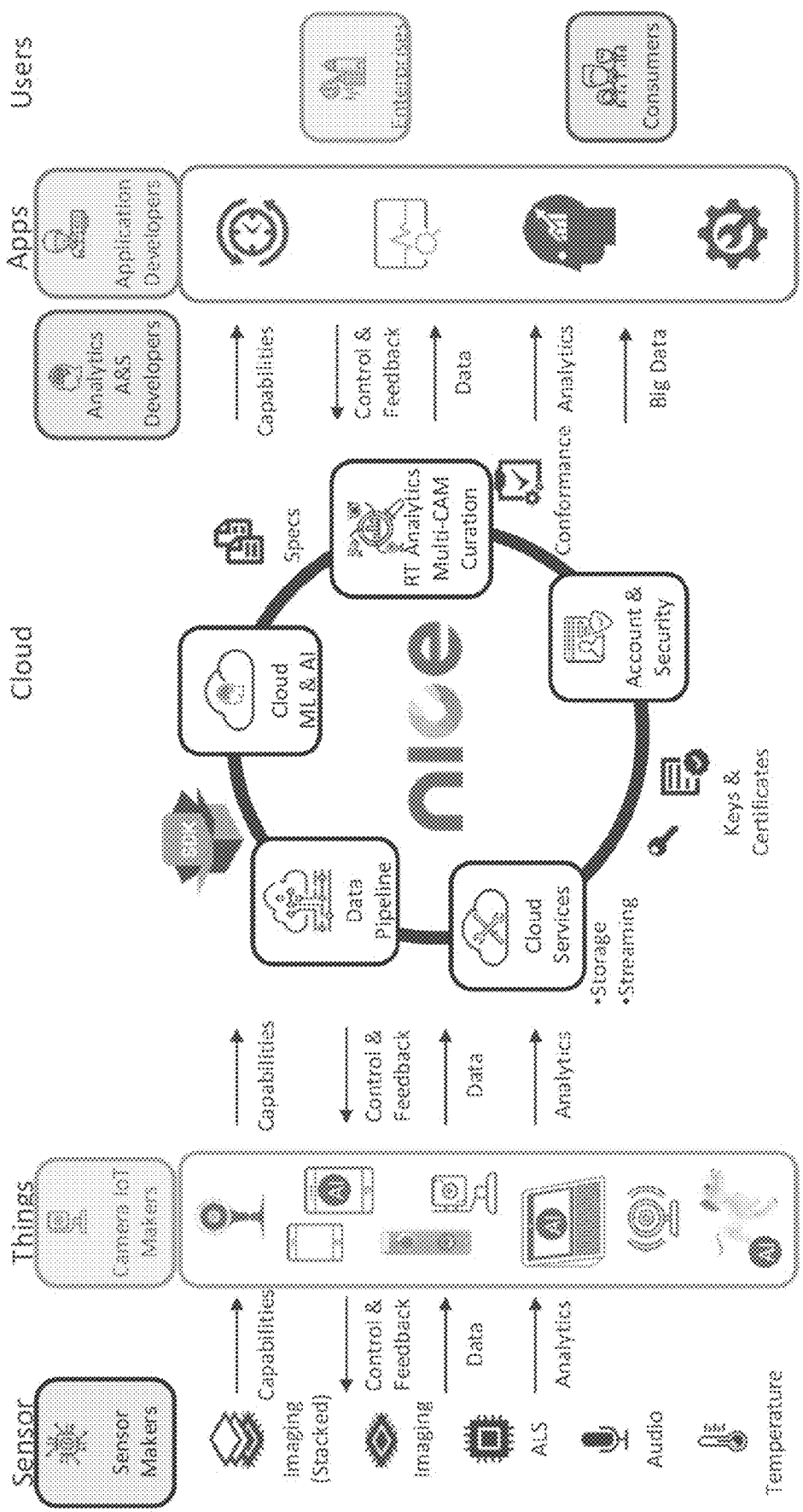
FIG. 1 shows a multi-layer technology stack.

The figures and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Introduction

Machine learning, AI and other types of processing are advancing. These techniques can be used to process images (including video) to predict what will happen in the video. "Natural video processing" is analogous to natural language processing for text and audio. Natural video processing provides higher level contextual understanding of videos. The technology disclosed in this document provide a framework for technology components, from the low-level sensors capturing images to the most sophisticated AIs, to support the implementation of natural video processing. This can include promoting and enabling analytics based on video sequences from multiple image sensors.

For example, at home, there may be several cameras. A surveillance system may have these multiple cameras capture events and then the system can make predictions, such as a person entering the house will most likely appear next in the living room or kitchen. After that, they may appear in the bedroom, and so forth. It may make these predictions based on a proximity map of the cameras. Instead of using just one camera, using multiple cameras for sequencing events is more interesting and powerful, but it is also a harder problem to solve. To predict future video sequences or events, metadata from prior events may be used to trigger other cameras to change their operation to capture relevant images stemming from the initial event.

The multi-layer stack from sensor to cloud may be divided into layers, such as sensor, device, cloud and application layers. Functional components within the layers may be referred to as nodes. To facilitate sequencing of events, the nodes may be organized into hierarchical structures. Sequencing of events can also reduce latency. In surveillance applications, reduced latency results in earlier understanding of what is going on and earlier notification and actions. If the system can predict what is going to happen next, or at least what future events may occur based on earlier captured events, then latency may be reduced. In another aspect, cameras and other nodes can run different types of AI models or AI processing. By predicting future events, the system can load the proper AI model in real time. This is dynamic loading of AI models.

To achieve these, communication between nodes and layers of the stack is important. Image or other sensor data may be analyzed for events and the detection of events may be captured in metadata packages, referred to as SceneMarks below. SceneMarks may be used for message passing between cameras and other nodes. If a camera captures some event and generates the corresponding SceneMark, that can be forwarded to other cameras that are likely to have subsequent events triggered by the initial event. Sequences and collections of SceneMarks accumulated over time may also be analyzed to produce higher understanding and context, including prediction of future behaviors.

The following disclosure is divided into three general topic areas. First is a description of layering and nodes, including hierarchy and grouping of nodes. Second is distributing AI among these layers and nodes. Third is tracking sequences using metadata packages, such as SceneMarks.

Technology Stack Layers and Nodes

FIG. 1 shows a multi-layer technology stack. Left to right in the figure corresponds to bottom to top in the stack. The stack includes a sensor layer (sensor column in FIG. 1), a device layer (Thing columns in FIG. 1), a cloud layer that contains various resources and capabilities including computing and storage (NICE and Analytics A&S in FIG. 1), and an application layer (Apps column in FIG. 1). The far right side represents the user. In one approach, the different layers and interfaces between layers are defined by standards. The standard may define how image or other sensor data is captured from sensors and then passed on to the next layer, like a camera module or more processing intensive devices. This device may be a bridge device, which bridges to a sensor that is not standards-compliant, or it may be a processor inside the camera device or IoT (Internet of Things) device. Sensors are getting more intelligent and may also have some processing power. The encapsulating device also may have powerful processors and some way to communicate to the cloud and application. With different layers and interfaces defined, a custom workflow may be implemented across the different layers from sensors to applications to present the desired contextual understanding to the end user. For example, see U.S. patent application Ser. No. 16/355,705, "Configuring Data Pipelines with Image Understanding," which is incorporated by reference in its entirety.

These four layers can accomplish many tasks. Also, machine learning can be applied to data accumulated over a period of time. Applications can also access this data, so that the user can use whatever events or data are relevant. Analysis can happen at any layer or node, depending on what processing power each node or each layer has. The sensor layer may have some analytic capability and then it sends analytics in addition to raw sensor data. The device layer has more advanced processing capability. The cloud can not only generate analytics data, but it can also generate information from machine learning using data accumulated over time. These analytics and data and results from big data anlaysis can be fed to the applications, which can use all this information to process for whatever the end user need is.

As shown in FIG. 1, the multi-layer stack may also be divided into different planes: capability, control (including feedback) and data (which includes data, analytics and big data in FIG. 1). Components on each of the layers have different capabilities to either capture sensor data and/or to process or analyze data. The system communicates these capabilities among the different layers. An overall workflow may be determined by selecting, configuring and linking different nodes at different layers based on their capabilities. For example, a certain device or sensor may be able to capture images using different configurations. It may be able to capture different exposures, at different frame rates, in either color or black/white. Those are sensor capabilities. Knowing what capabilities are available helps the higher layers to determine how to configure those sensors. The device layer may take those sensor layer capabilities and combine that with its own processing capabilities and then communicate those composite capabilities up to the applications or services running on the cloud. These are the capabilities arrows shown in FIG. 1.

The application or cloud (or other layers), knowing what kind of capabilities are available, can send control signals to implement the desired workflow. These are the control and feedback arrows shown in the middle of FIG. 1. This control plane can require a lot of detail if the application is required to directly provide complete control data for every component beginning at the sensor layer all the way through the cloud layer. However, layering virtualizes this control, so that each layer can deal with a limited number of other layers while abstracting away from the lower layers. For example, the application layer can deal with what kind of event to capture and provide corresponding control data to the device layer. The device layer translates that into control data for the sensor layer. In one approach, the control data is packaged into higher-level SceneModes between edge and cloud, and lower-level CaptureModes between device and sensor (within the edge). For further descriptions, see U.S. patent application Ser. No. 15/469,380, "Scene-Based Sensor Networks," which is incorporated by reference in its entirety.

In this way, the application can specify the overall workflow by defining the relevant mode (e.g., SceneMode) for capturing and processing data. Within that mode, the camera or other devices then define the corresponding modes (CaptureModes) for the sensors. For example, assume the task is to recognize a person's face. For this, the workflow may want to capture multiple shots of the face at different exposures and different angles. So the SceneMode may be face detection mode or object detection mode. That SceneMode is communicated to the camera device layer and the device layer then defines the relevant types of CaptureModes. The CaptureMode is translated to the sensor layer and then the sensor can determine the right types of data capture sequences. This is a benefit of having virtualized layers and having control somewhat virtualized between layers.

These capabilities and controls are translated from top layer to bottom sensor layer. Data can be transferred in the reverse direction from sensor to device, and device to cloud. The sensors generate the raw sensor data. The device layer can then process that data with more powerful processors and with more AI and computer vision (CV) algorithms applied. It can select what is important, what is relevant, and then make this data more indexable or searchable and present that data to the cloud. The cloud can then use more powerful processing with access to more resources to further analyze the data. In this example, the sensor and device layers are "edge" components, and the cloud and app layers are away from the edge. For convenience, nodes that are not on the edge will be referred to as "cloud", even though they may not be actually "in the cloud."

The examples below are based on the NICE (network of intelligent camera ecosystem) standard, although the disclosure is not limited to this standard. The NICE standard defines standard APIs between different layers of the technology stack from sensor to cloud. It also allows the definition of different types of data packages, referred to as SceneData and SceneMarks. SceneData include sensor data, for example video. SceneData can include raw sensor data and/or processed/combined sensor data. SceneMarks include contextual metadata resulting from the analysis of SceneData and/or other SceneMarks. For example, SceneMarks may indicate the presence of various trigger events (e.g., human detected). SceneMarks typically include links or references to the underlying SceneData and may also include thumbnails or other abbreviated versions of the SceneData. Metadata is packaged as SceneMarks and sensor data, including image data, is referred to as SceneData. SceneData (from multiple sensors) and corresponding SceneMarks may be organized and packaged into timestamped packages, referred to as SceneShots which aggregate the relevant data for a scene. For example, the sensor data from cameras looking at the same environment, including processed versions of that data and relevant metadata, may be packaged into SceneShots. For further descriptions, see also U.S. patent application Ser. No. 15/469,380, "Scene-Based Sensor Networks," which is incorporated by reference herein. See also Section X below.

Figure 2A:
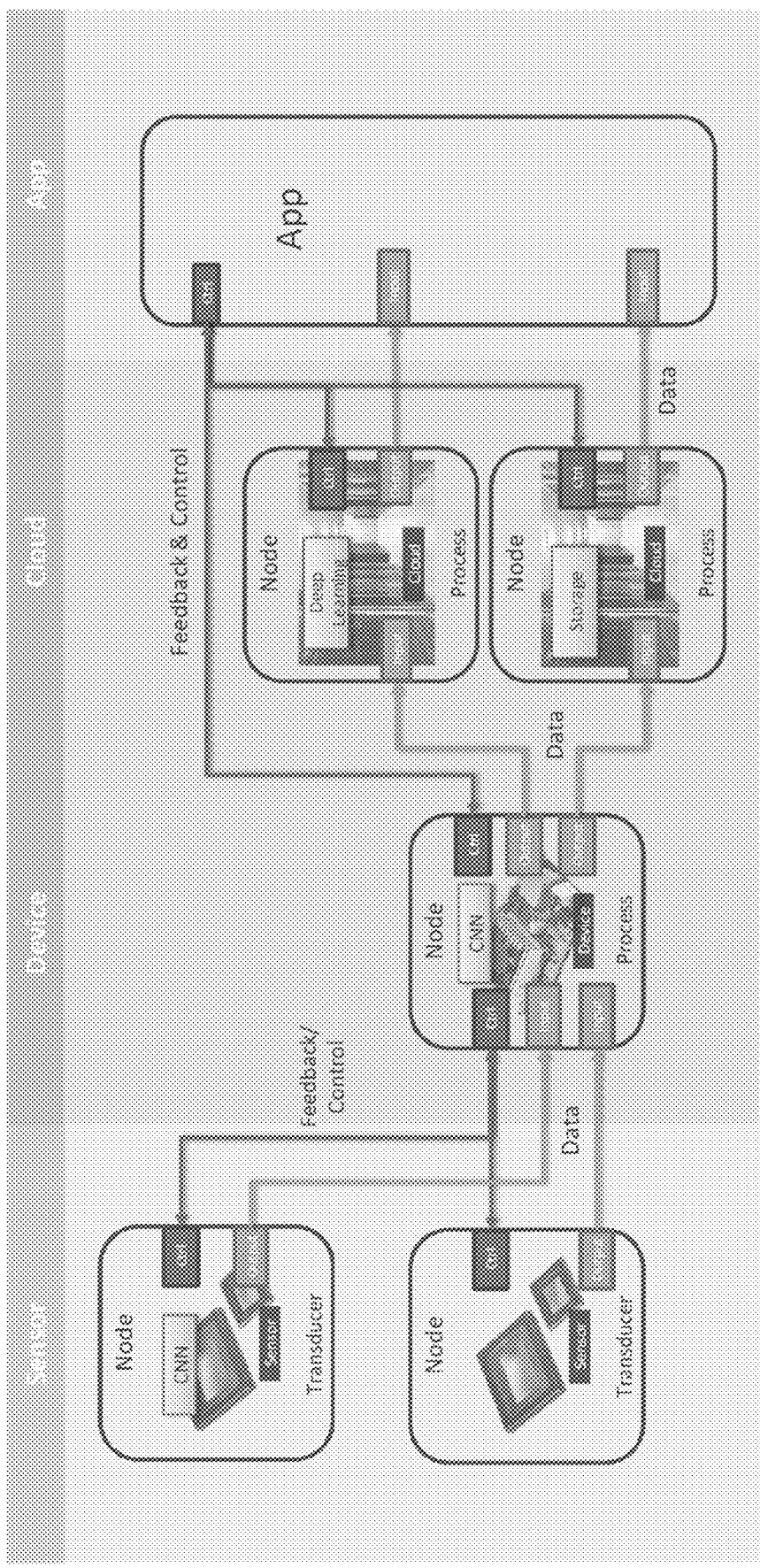
FIG. 2A shows nodes within a multi-layer technology stack.

FIG. 2A shows nodes within a multi-layer technology stack. The capabilities of different functional components within the stack may be containerized and referred to as nodes. For example, see U.S. patent application Ser. No. 16/355,705 "Configuring Data Pipelines with Image Understanding", which is incorporated by reference in its entirety.

Sensor-level nodes may have capabilities to capture sensor data, and the camera module or device-level nodes have processing capabilities. Cloud-layer nodes may have a wide variety of powerful capabilities.

AI and machine learning, such as convolutional neural network (CNN), may be performed by nodes at any layer. At the sensor layer, the sensor may capture images and process them using CNN to reduce the amount of data passed to the device layer. At the device layer, the sequence of CNN processed images of interests may be processed, also using CNN or other types of AI or CV (computer vision), detecting events of interest and generating corresponding metadata. At the cloud layer, the metadata and sensor data from multiple cameras may be analyzed, also using AI, producing the final result desired.

Different nodes have different capabilities. For example, some nodes may process color images, or IR images, or black and white images. Some nodes may perform motion based processing or detect more specific events such as a person falling. Or perhaps some people are fighting and then the fighting is becoming dangerous. That kind of high level understanding of what is going on requires more power and more resources. Cloud nodes can process such analytics. Finally, the application will receive this data and may further process it for end user requirements.

Figure 2B:
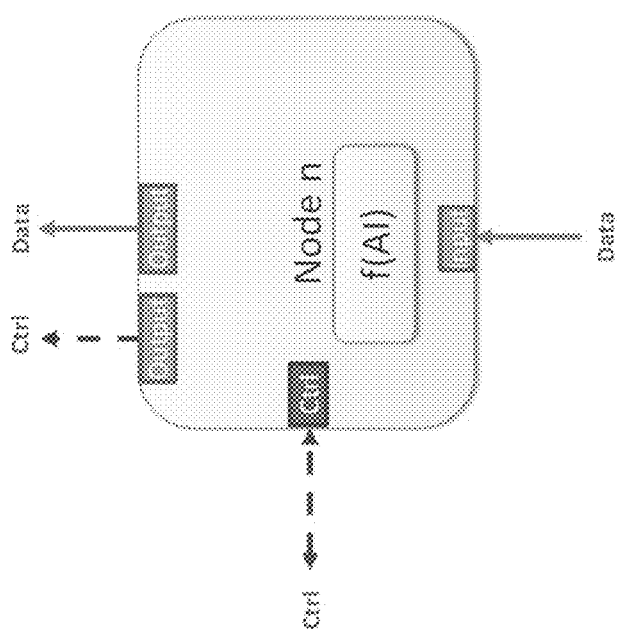
FIG. 2B shows structure of a node.

FIG. 2B shows structure of an example implementation of a node. The node has one or more ports, which may be input ports or output ports. It may also have transducer capabilities and/or processing capabilities. FIG. 2B is a generic block diagram of a node. Actual nodes may not have all of the functions shown.

Transducers can broadly be subdivided into sensors and actuators. Sensors translate external stimuli into data. Examples include image and other spectral sensors, microphones, temperature or heat sensors, pressure sensors, and smoke and other chemical sensors. Actuators translate data into external stimuli. Examples include speakers and tactile feedback.

The physical transducer may be incorporated within the physical node. In cases where the node contains the physical transducer, there will be direct access to the transducer functions. However, the node may also have access to transducer functions for transducers located outside the node. For example, a legacy camera may not be compatible with a standard implementing the concepts described herein. In that case, a bridge may serve as the node with access to the camera's capability. This also applies to the processing functions.

Processing includes image processing, which can be further subdivided into image development and image understanding. Image development are lower level functions used to improve the quality of images. Examples include correction of sensor bias, correction of pixel defects, vignetting compensation, dark frame subtraction, white balancing, demosaicing, noise reduction, spatial filtering, color space conversion, tone mapping, gamma correction, contrast enhancement, edge enhancement, aberration correction, focus adjustment, exposure adjustment, resampling, resolution enhancement, high-dynamic range adjustment, and color filter array interpolation.

Image understanding are higher level functions used to understand the content of images or context of a sequence of images. One example is the detection of the presence or absence of a specific object: the detection of faces, of humans, of animals or certain types of animals, of vehicles, of weapons, of man-made structures or certain type of structures, or of texts or logos or bar codes. A higher level example is the identification (i.e., recognition) of specific objects: the identification of a terrorist in a crowd, the identification of individuals by name, the identification of logos by company, the identification of an individual against a passport or driver's license or other credential. An even higher level example of image understanding are further characterizations based on the detection or identification of specific objects. For example, a face may be detected and then analyzed to understand the emotion expressed. Other examples of image understanding include the detection and identification of specific actions or activities, and of specific locations or environments.

Processing can also include other functions, such as transcoding, encoding, and encryption/decryption. For the data plane (orange arrows), the inputs and outputs include sensor data and metadata, such as resulting from analytics. SceneData and SceneMarks from previous nodes are received at the input or generated based on the capture of sensor data in the case of sensors. These are processed by the node, and the resulting SceneData and SceneMarks are output to other nodes. The control interface on the left receives control and configuration data. The node may also use this port to transmit its capabilities and data monitoring its operation.

The orange output port with blue control arrow is an output used to control other nodes, for example to understand sequences. For example, a device that detects a human may send that SceneMark to another camera in close proximity. The receiving camera uses the SceneMark as a control signal to change its configuration based on the expected appearance of the human. The capture sequence for the camera may be changed, or feedback may be provided to trigger switching of AI models and settings in response to the detected event. An AI model for the detected human may be loaded into the receiving camera to allow it to more easily detect the expected human.

Figure 3:
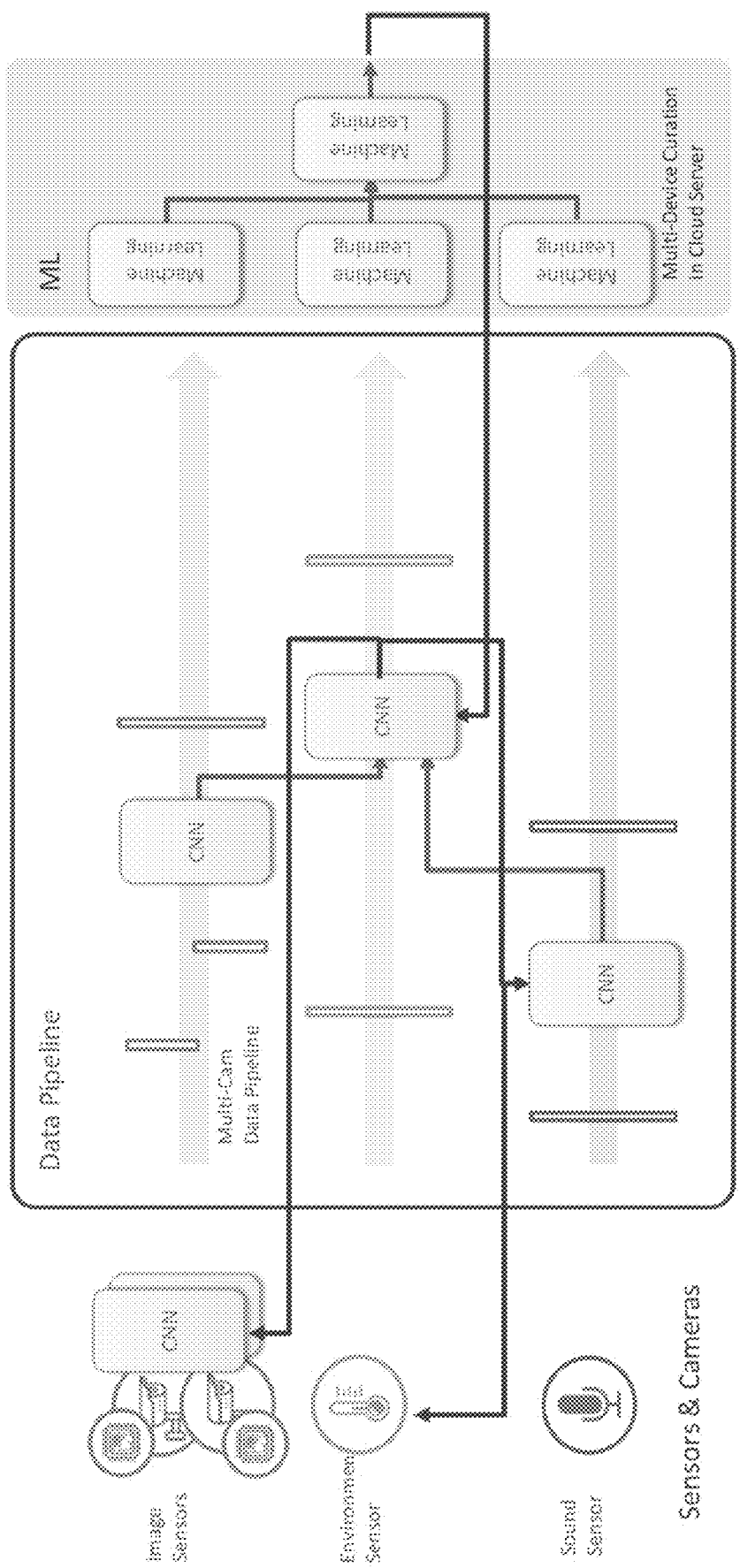
FIG. 3 shows interaction of nodes within a multi-layer technology stack.

FIG. 3 shows interaction of nodes within a multi-layer technology stack. This shows how layering and nodes can be placed and then how these can interact with each other. On the left side are sensors, including some devices with AI capabilities. Sensors can also include very simple sensors, like a temperature sensor that just generates the temperature continuously without any other analytic capabilities. In that case, the data pipeline may include a bridge device which has more capability. In FIG. 3, "CNN" denotes convolutional neural network capability and "ML" denotes machine learning capability, although other types of AI capability may be used.

SceneData and SceneMarks propagate through this data pipeline, as shown by the arrows pointing to the right. The data pipeline may include filtering or different kinds of event detection. Filtering may eliminate duplicate or false SceneMarks. Once filtered, the data can go through more advanced analytics, so that is why some of the arrows are shown as staggered. Of the CNN's, some data will go through multiple stages and some will go through single stages. Some of these may feed back to lower-level nodes, as shown by the red arrows. The lower-level node then can have a better AI model or can detect the images and analyzed images more appropriately or more relevant to the task of interest.

Data accumulated from the pipeline can go through machine learning processes, as shown on the right of FIG. 3. The machine learning can determine if certain events (e.g., objects appearing) should trigger certain analytics. Then nodes can be better configured with the appropriate AI models. That is what the red arrows are showing. This is some of the control feedback. Some of the analytic capabilities can be reconfigured using this data from machine learning.

Figure 4:
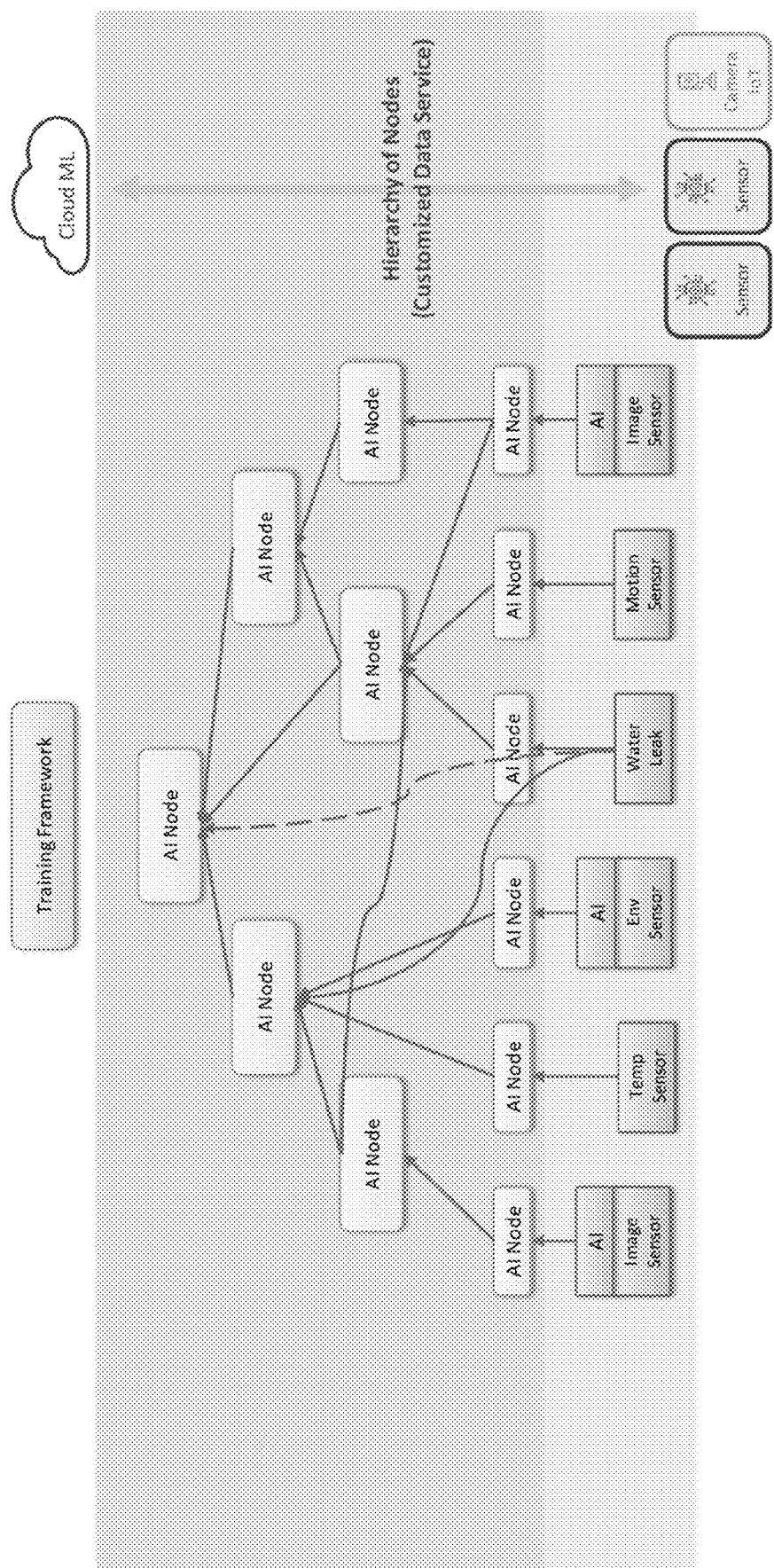
FIG. 4 shows a hierarchical view of nodes within a multi-layer technology stack.

FIG. 4 shows a hierarchical view of nodes within a multi-layer technology stack. This hierarchy is based on data flow, as shown by the blue arrows. There are many different types of sensors on the bottom. Some nodes have AI capability and some do not. Depending on what event, some of the events detected by nodes will be grouped as related events or as parts of a same event. These may be fed upwards through the hierarchy to the top node, where that node will examine data from multiple devices to figure out the context of the situation. The training framework at the top of FIG. 4 uses machine learning or other AI to analyze what happens, using data collected over time. This can be used to improve the overall performance. In this example, a separate data service (customized data service in FIG. 4) constructs the network of nodes, including dynamic configuration of nodes.

Figure 5A:
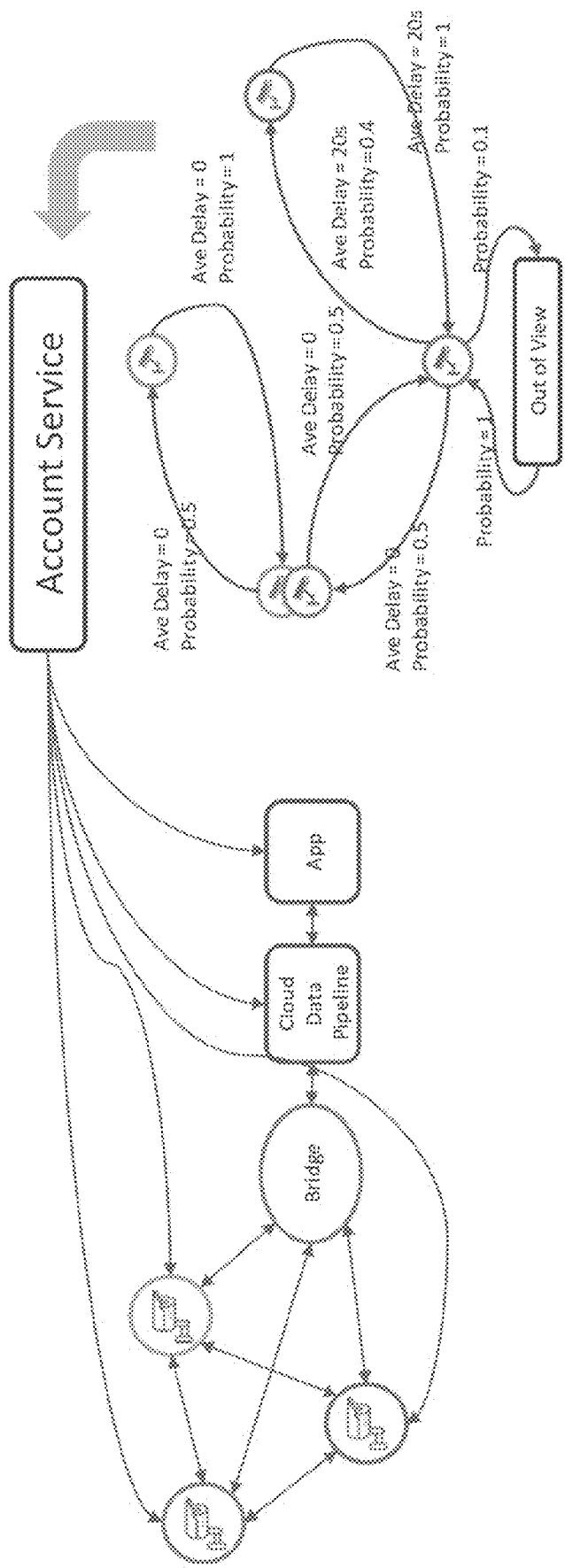
FIG. 5A shows use of a proximity map with a multi-layer technology stack.

FIG. 5A shows use of a proximity map with a multi-layer technology stack. The left side shows the stack. The right side shows a proximity map of the sensors, which will sometimes be referred to as a Tube Map. The Tube Map describes the spatial relationship between cameras. It has information about the average delay and probability of an object or person appearing in one camera and then appearing in an adjacent camera. This can be used to predict future events. For example, if the average delay between camera 1 and 2 is 15 seconds and first camera detects a human, the second camera may be instructed to switch to the appropriate SceneMode for detecting the same human from t=10 s to t=20 s. The Tube Map may also be used to allocate nodes into groups. For example, the stack may include cameras at different locations around an outside shopping mall. From the Tube Map, the cameras (and other nodes) may be grouped into individual stores, the stores into buildings, and the building into different sections of the shopping mall.

Figure 5B:
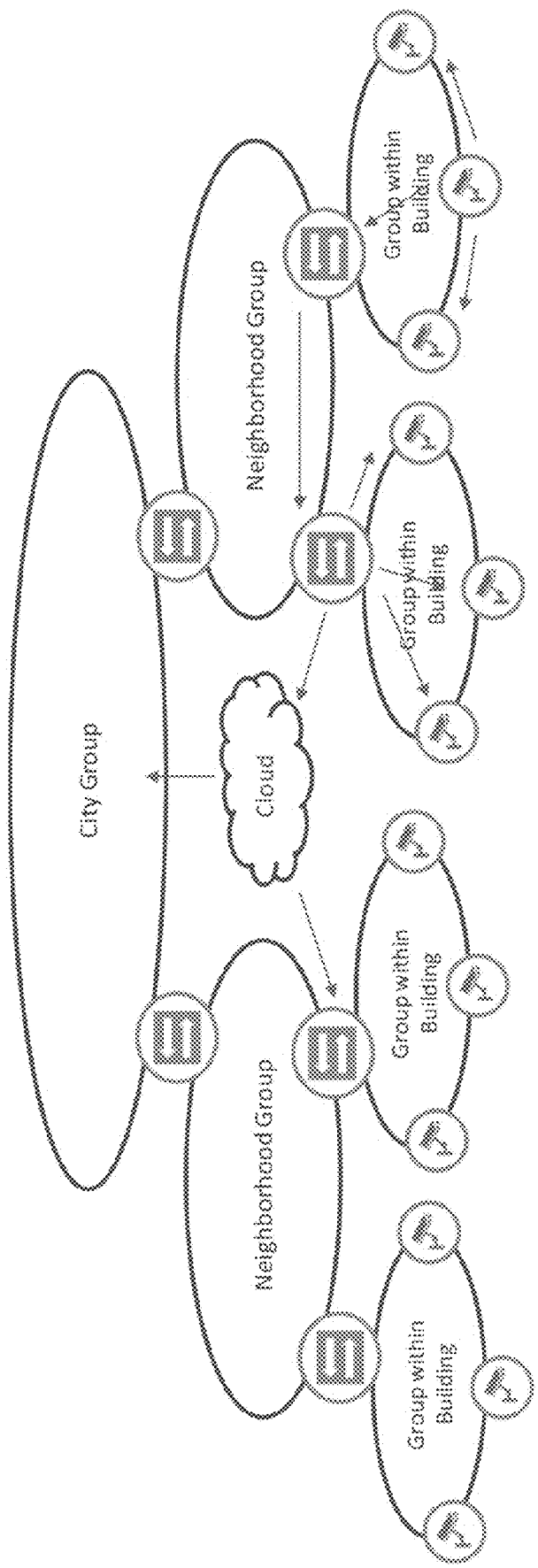
FIG. 5B shows grouping of nodes into a hierarchy.

FIG. 5B shows an example hierarchy of nodes. In this case, the hierarchy groups node into buildings, building into neighborhoods, and neighborhoods into cities. The camera symbols represent nodes with image sensors and the other symbols represent processing nodes, which may be on the cloud. Nodes may be assigned to multiple groups. SceneMarks may be published to other groups via gateways. Data collected from the stack may also be used to update the Tube Map and/or the hierarchy of nodes. In FIG. 5A, a cloud service (Account Service) performs this task.

Figure 6A:
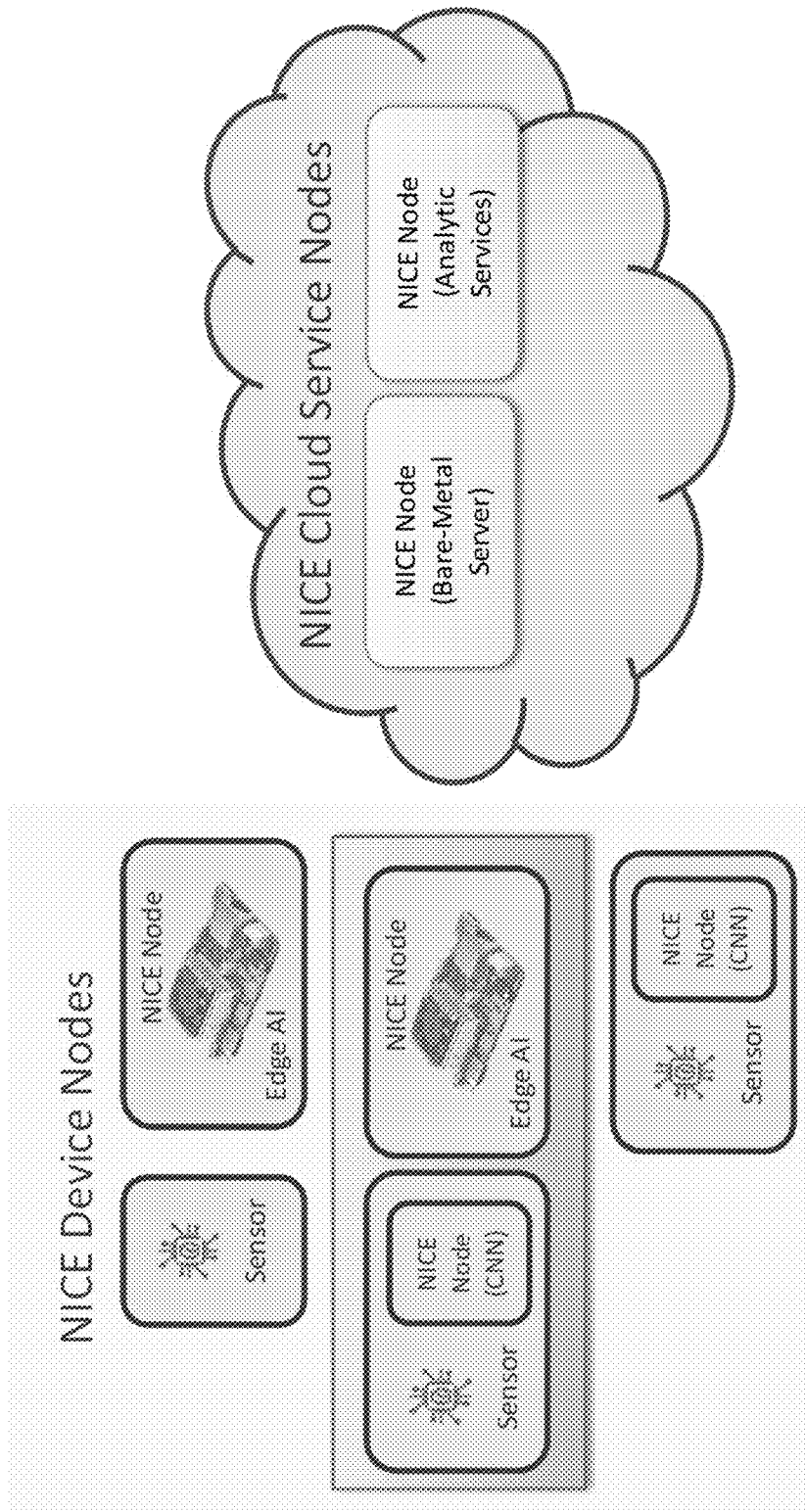
FIG. 6A shows a technology stack using third party cloud services.

FIG. 6A shows a technology stack using third party cloud services, in compliance with the NICE standard. The stack includes NICE device nodes and cloud service nodes. In many situations, a lot of data may come directly to the customer's data center, which may be bare metal servers. A third party service provider can provide filtering and initial analytics there. The third party service provider can also provide separate cloud based analytics.

Figure 6B:
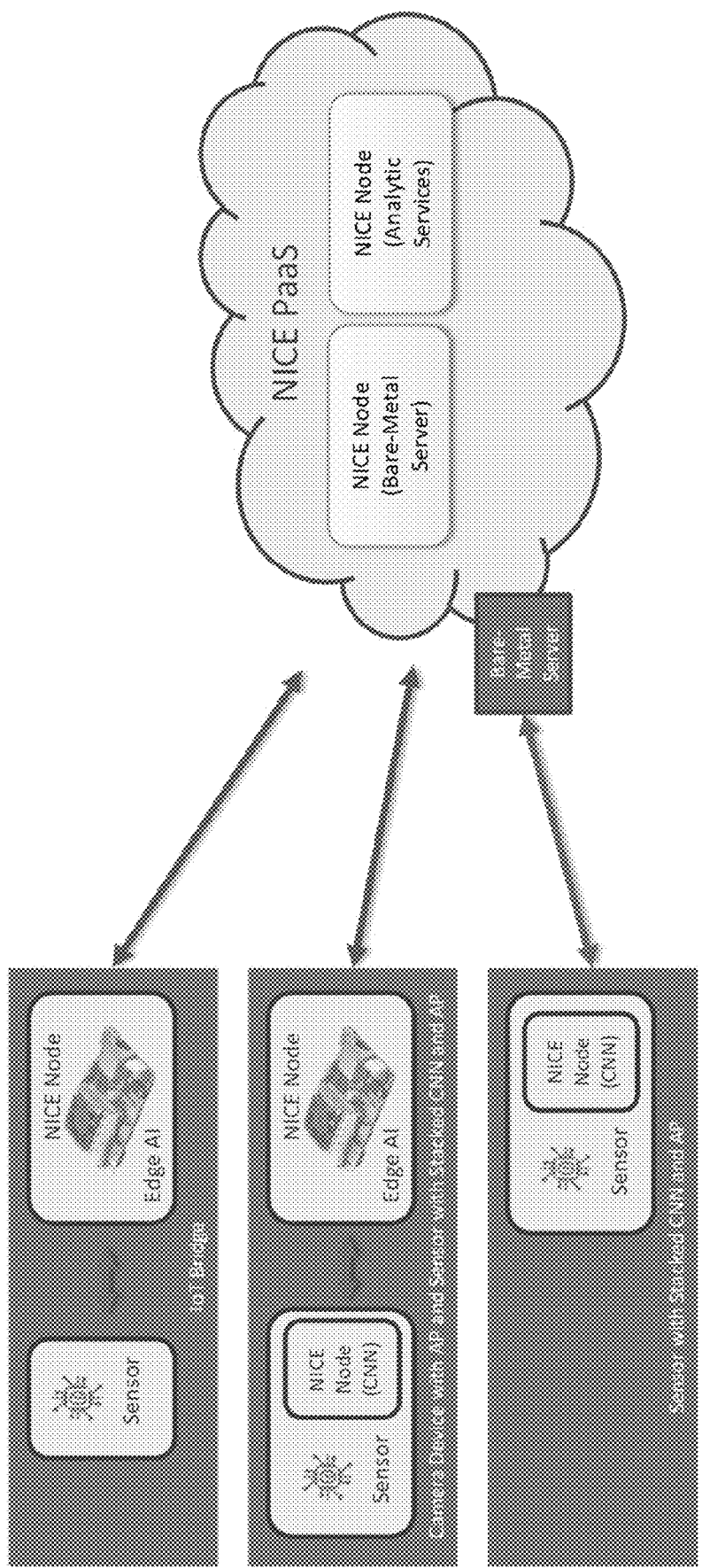
FIG. 6B shows dynamic AI modeling among different nodes.

FIG. 6B shows dynamic AI modeling among different nodes. The green arrows show edge to cloud interfaces, and the red arrows show sensor-device interfaces. Some edge nodes such as legacy sensors may have simple or no processing capability. In that case, more complex processing is allocated to the cloud. For more powerful edge nodes, some processing can be done there. Different nodes have different capabilities, so AI can be allocated according to what capabilities are available.

Some feature of layering and nodes include the following:
Interface definition is standardized and supports dynamic AI models, including sensor interface (e.g., sensor to device layer) and edge to cloud interface. Common interface is used for distributed AI processing.
Node I/O definition is standardized
  Defines the classification and capability of the target nodes at different layers
  Defines container format for delivery of AI models
AI processing may be distributed among different layers
  Feeding sensor data and event metadata (e.g., SceneMarks and SceneData) from one or more data pipelines into one or more sequential AI algorithms where the sequential AI algorithm may predict a future sequence of events or categorize a sequence of sensor data and events
  Using the output of the sequential AI to reconfigure the control data (e.g., SceneModes) for the nodes in the data pipelines feeding into the sequential AI algorithm.
Layering and grouping of nodes
  Hierarchal node structure and grouping
  Having AI processing nodes accepting sensor data and event metadata from multiple nodes from different layers in the network
  Node definition to support peer to peer distribution of sensor data and event metadata
  Using the proximity map to create groups and group hierarchy of nodes
    Having a third party service to do this
    Managing the allocation of nodes into groups based on how the nodes are linked to accounts and how nodes are mapped into the proximity map (e.g., Tube Map)
  Logical definition of interfaces to layers, including for SceneMarks, SceneMode, SceneData and AI models
Distributed AI Allocating AIs to appropriate nodes is important. FIG. 7 shows computing power available at different layers, although this will change over time. The cloud layer includes data centers. Effectively, they can have unlimited processing power and can handle unlimited model size. Cloud nodes can do many different types of analytics essentially without restrictions on frame rate. Frame rate is how many frames can be processed per second. The device layer currently typically includes NVIDIA, Intel and other application processor-based devices. It has some limited processing capability and it also has some limited memory. This leads to some model size limitation and it typically can only process at the frame rate of the sensor. Nowadays, the sensor layer may have some processing by using a stacked sensor or smart sensor. Sensor nodes have processing power that typically is much less than the device or cloud layers and also have limited model size. Accordingly, analytic capabilities are also limited.

Figure 8:
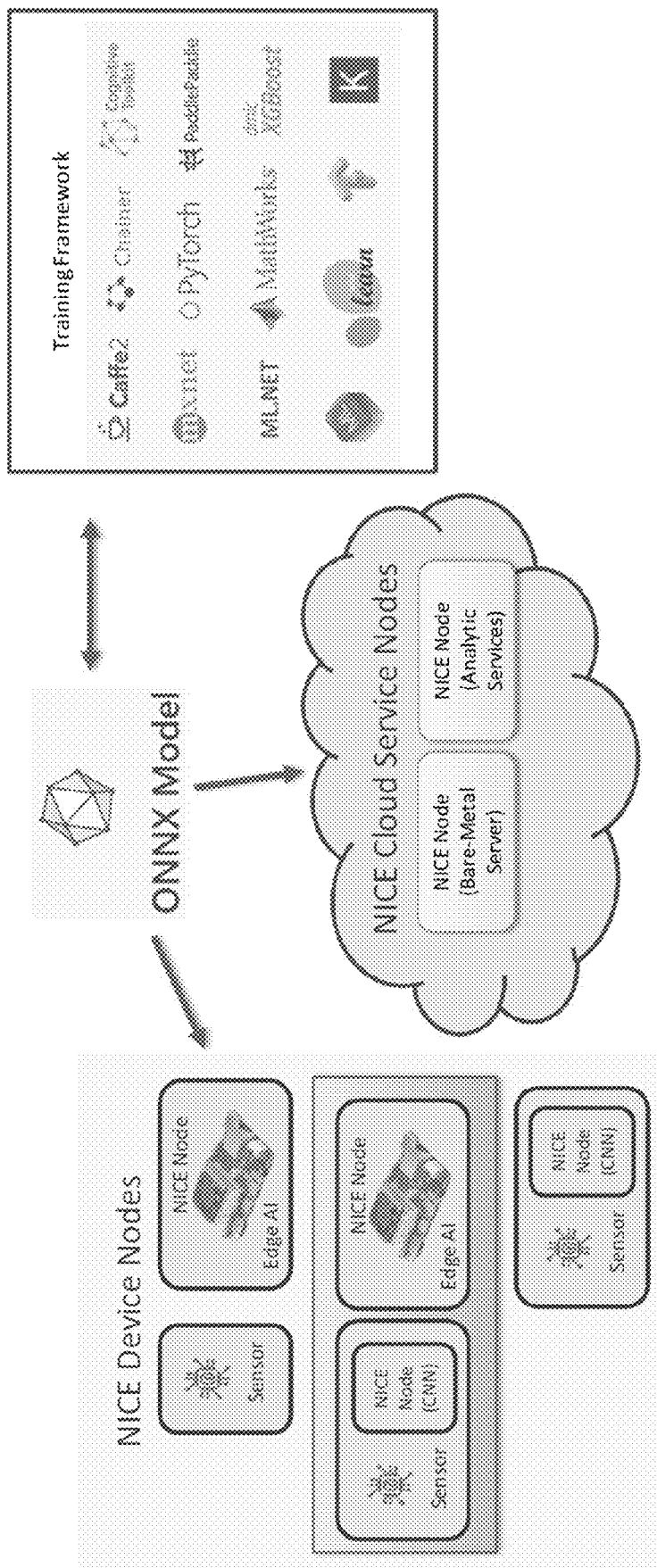
FIG. 8 shows dynamic distribution of AI models.

FIG. 8 shows dynamic loading of AI models. Here, the AI model to be distributed is represented by an ONNX model, although other formats may be used. To statically deploy an AI model on a node, the AI model typically is tuned to the limitations of the node and compiled for the node. It may be manipulated to fit computational and storage limits of the node, for example by discarding weights. The compiled model is installed on the node. For hardware nodes, the compiled model typically is specific to a particular hardware platform, such as Jetson Nano or Movidius or ARM or other DSPs. However, static deployment usually means the model installed on the nodes does not change over time. It is installed once and then it persists. In FIG. 8, different models may be dynamically distributed to nodes depending on the task at hand.

Dynamic distribution may also include various security aspects to address the following:
  Model has not been tampered with. Tampering may cause model to behave incorrectly and not detect items of interest.
  Confidentiality of model. Significant effort may have been made to develop and train the model. The model vendor may wish to protect their IP.
  Controlled distribution and usage of model. Model vendor can impose business models for model usage: pay per use, pay per deployment, monthly subscription, etc.

In FIG. 8, the AI model can be dynamically loaded into different layers. In addition, the representation of the AI model is in a platform independent format, since it could go onto different platforms. It could go onto an edge device and translated for execution on those devices. It could also be deployed in the cloud, either on bare metal servers or using analytics services which can accept these models.

Figure 9:
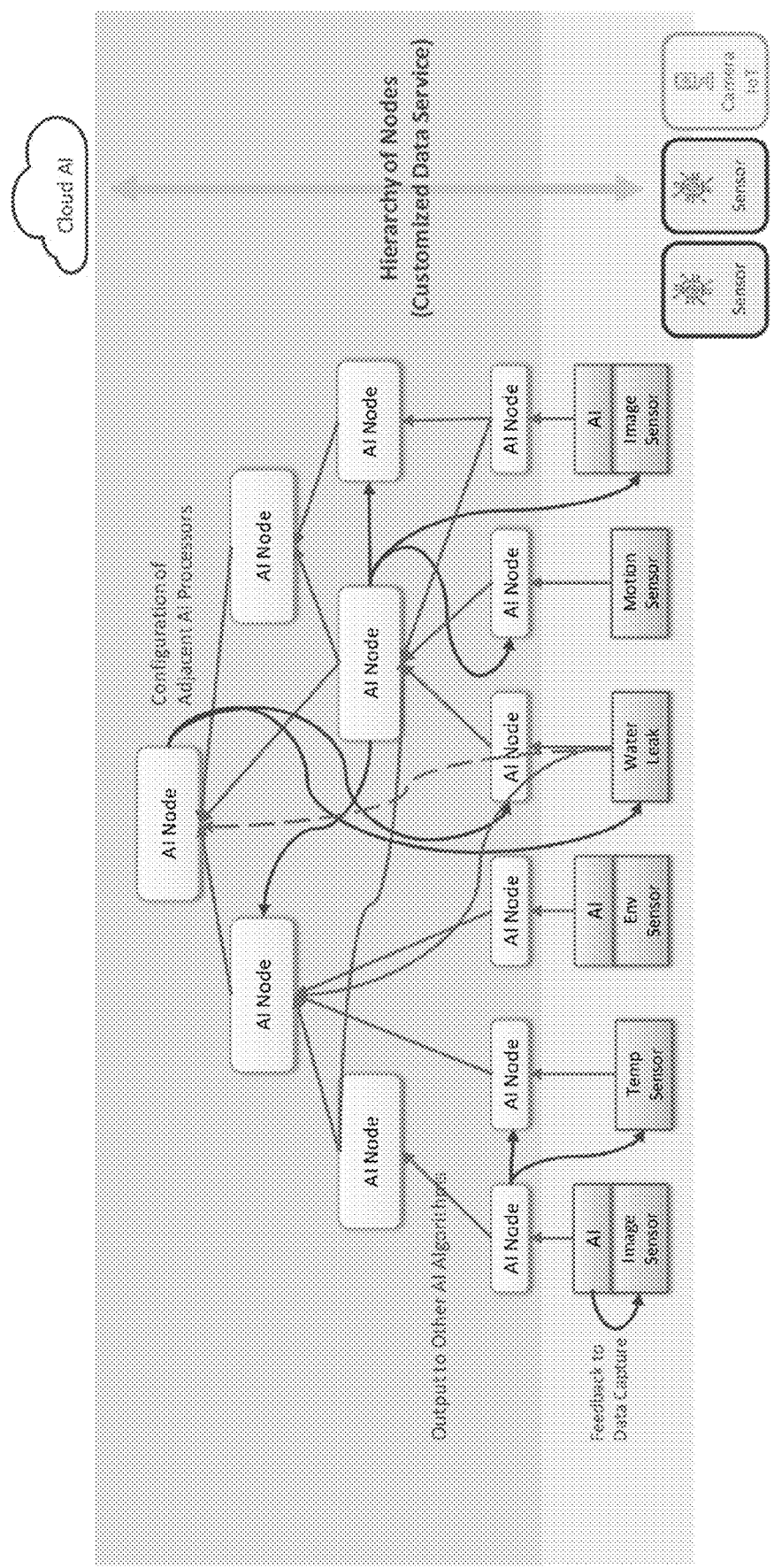
FIG. 9 shows a hierarchy of nodes with feedback.

FIG. 9 shows the hierarchy of FIG. 4, but with feedback for dynamic loading of AI models shown by the red arrows. Various nodes in the hierarchy make detections or decisions. This can trigger the dynamic deployment of AI models into lower level nodes or could cause triggers on various sensors. That is, the loading of AI models is conditional upon the occurrence of certain events. Feedback can also be provided horizontally within the layer or upwards to higher level nodes. The red arrows are feedback from different layers feeding to different layers. For example, cloud analytics may detect something about water leak and then send certain configuration parameters or AI models to the water leak sensor directly. On the far left side, the feedback is local to a stack sensor. The AI in the stack sensor reconfigures how the image sensor captures certain images. Nodes in the same layer can also send messages from one node to the other to load the right model, so that the nodes capture the right sensor data and/or perform the correct analytics.

Figure 10:
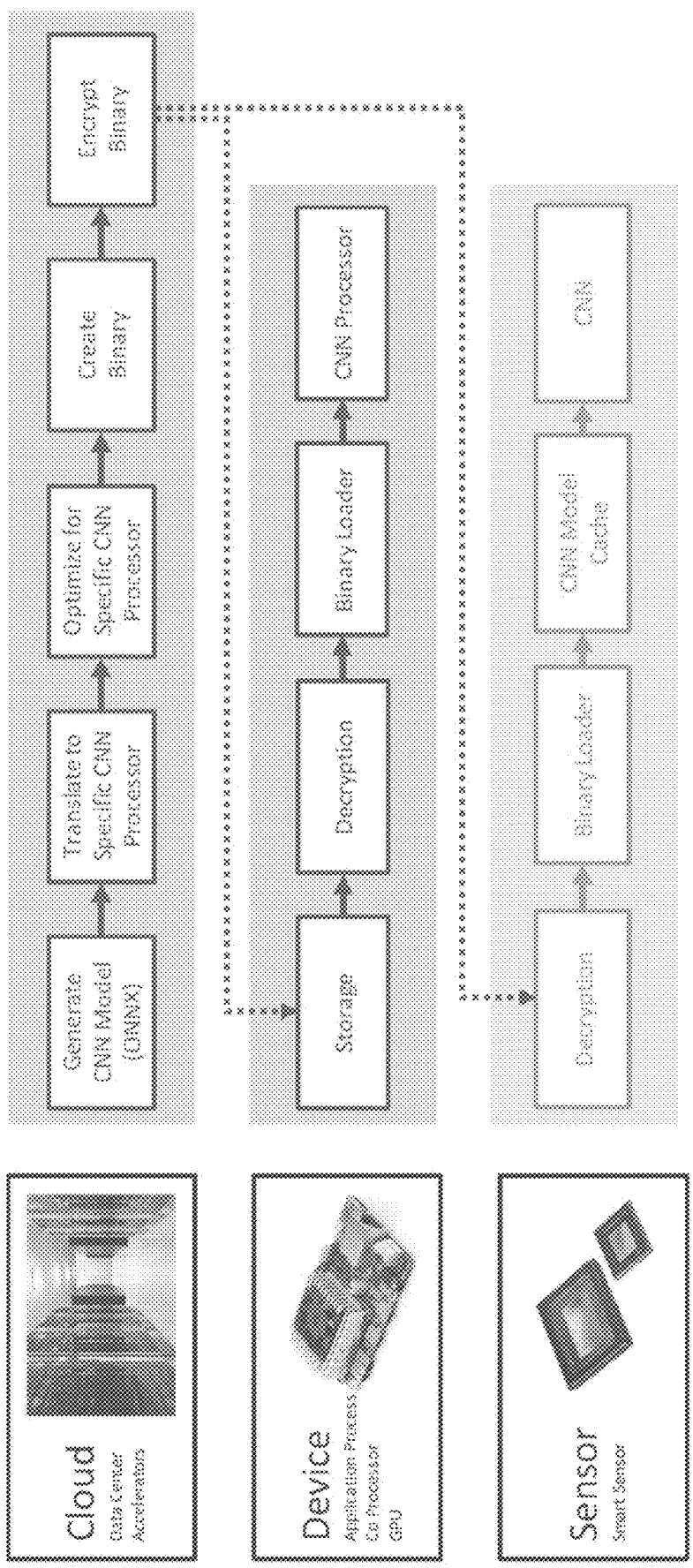
FIG. 10 shows a workflow for distribution of AI models to different nodes.

FIG. 10 shows a workflow for distribution of AI models to different nodes. The top row is a process for creating a binary which can be executed on a particular AI processor (node). In one approach to distribution, the encrypted binary is distributed and stored on the node for later use. It is decrypted when needed, loaded and executed. This is shown for the device layer, but it could be done for any layer. The sensor layer shows another example. In this approach, the encrypted binary goes through the decryption process and is loaded into the model cache in the sensor or in the sensor platform. This approach could also be used for other layers.

Figure 11A:
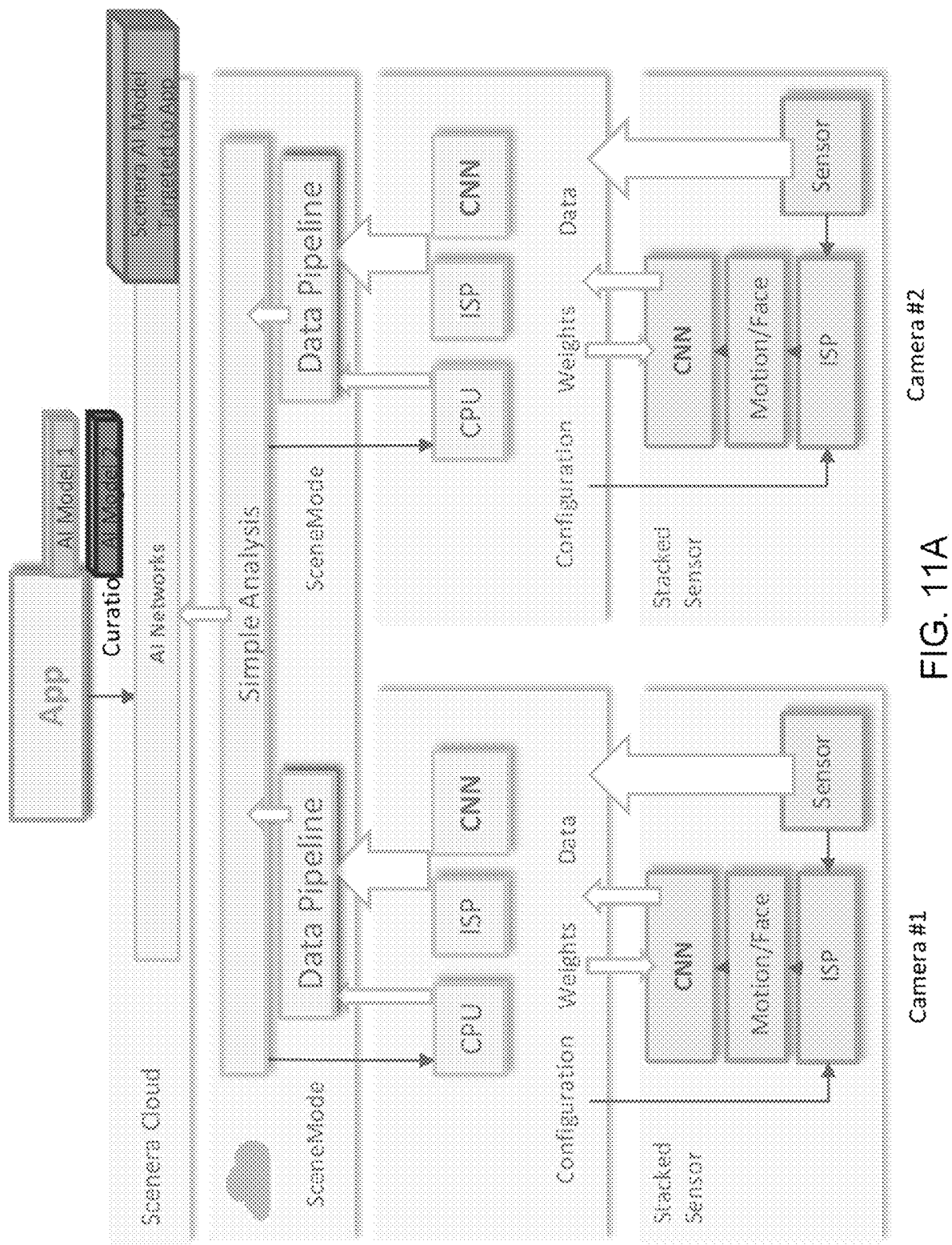
FIGS. 11A-11C show the distribution of targeted AI models through a multi-layer technology stack.
Figure 11B:
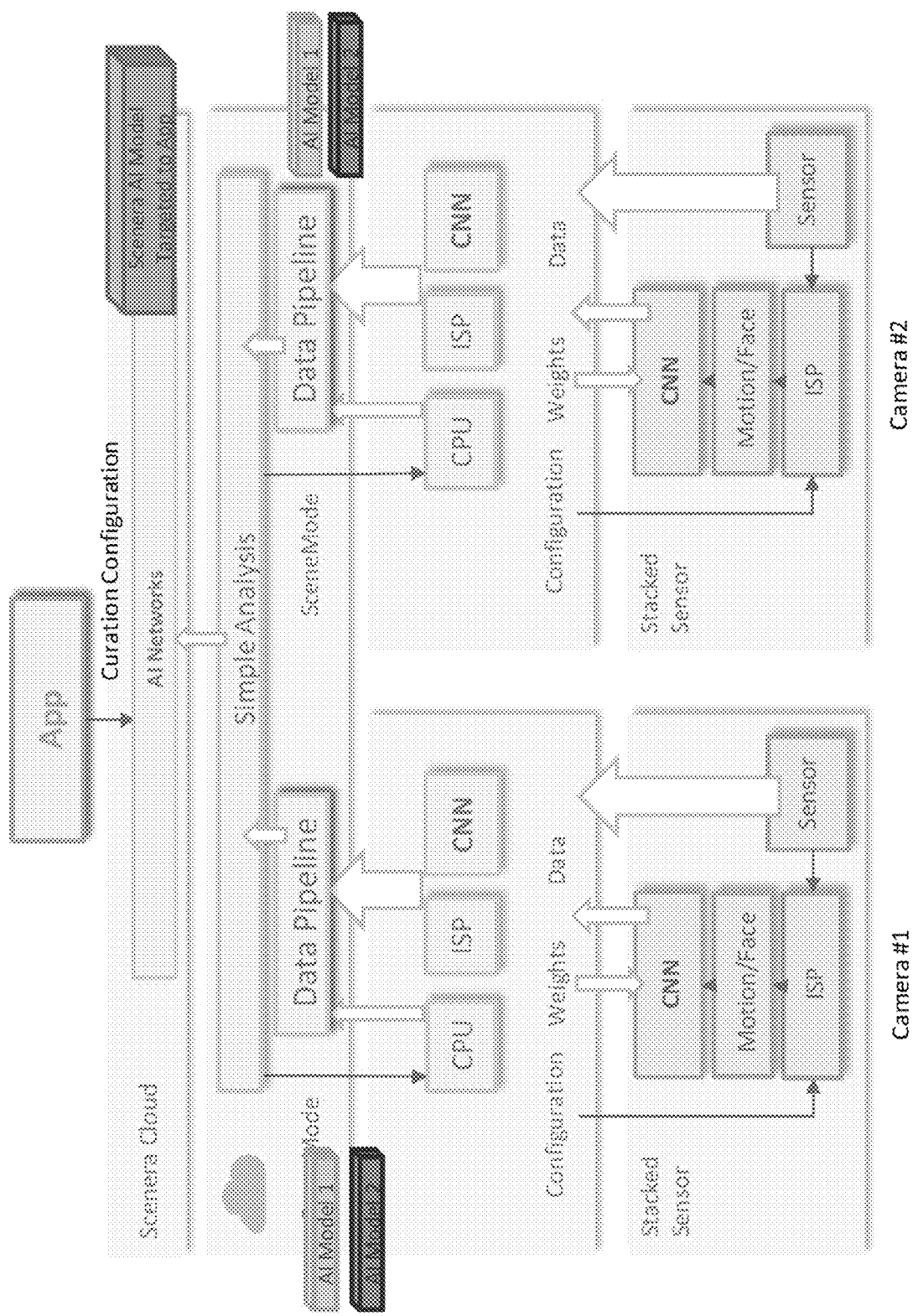
Figure 11C:
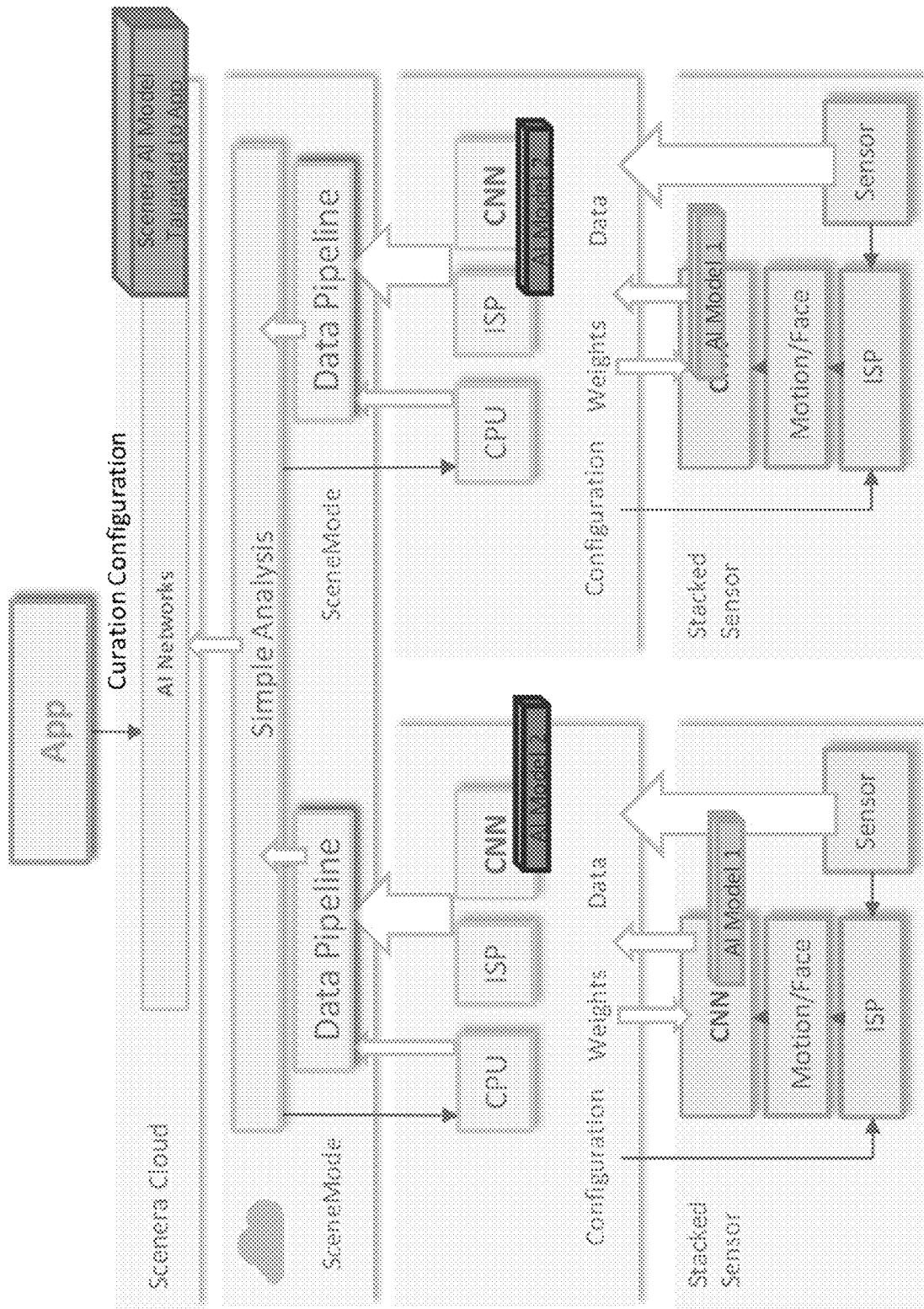

FIGS. 11A-11C show the distribution of targeted AI models through a multi-layer technology stack. This example uses a multi-layer technology stack with distributed AI processing for multiple cameras. This example shows two cameras and shows the different layers for each camera. The sensor layer is labelled "stacked sensor," the device layer is unlabeled, and the cloud layer is marked by the cloud symbol and "Scenera Cloud." Machine learning exists in all three layers, as shown by the CNNs in the sensor and device layers and the Simple Analysis and AI Network (broader range of machine learning and AI techniques) at the cloud layer.

The AI at the sensor layer may perform sensor level detection of objects, faces etc., and limited classification. Feedback to the sensor may be implemented by changing the weights of the CNN. Use of the sensor layer AI reduces bandwidth for data transmission from the sensor layer to higher layers. The AI at the device layer may include single camera analytics and more robust classification of objects, faces, etc.

In this example, the stacked sensor is the sensor and processor stacked together and offered as one device. If the sensor has many pixels (e.g., 100-megapixel sensor), then no processing means sending 100 megapixel data to the next layer, which requires lots of bandwidth. With a stacked sensor, certain processing is done at the sensor with a stack processor in order to reduce data. Only important data is retained and sent to the next layer. To do so, what should this low-level sensor do to accomplish the task for the top-layer application? Knowing what problem that the application is trying to solve and knowing the capabilities of the nodes, and possibly after capturing much data and learning through that data, the workflow determines what AI model runs at which layer. This could also be done in real time. In real time, depending on what the workflow is trying to capture and summarize, each node can be programmed to capture and process data more efficiently.

The AI at the cloud layer may include multi camera analytics and curation, interpretation of scenes and detection of unusual behavior. Simple data search techniques may be widely used in a cloud-based system. More sophisticated AI and machine learning, including learning characteristics of the relationships between nodes in the multi-layer stack, can also be done in the cloud. This can lead to a more customized or sophisticated AI compared to a generic cloud platform. FIG. 11A shows AI models targeted to specific applications. Data accumulated over time can be used to develop different AI models for different devices or different layers. This can include AI models for bridge devices or more advanced devices and also AI models for sensors which have some analytic capability like a CNN capability.

Based on accumulated data and intelligence (e.g., capturing sequences of SceneMarks as described above), the workflow may program a sensor or low-level devices to generate the low-level SceneMarks. Based on those low-level SceneMarks at the sensor level, data can be passed on to the next layer of the device, through a bridge device or using a more advanced camera with application processors. From there, the workflow can determine higher-level SceneMarks and then send both relevant sensor data and metadata (SceneData and SceneMarks) to the cloud. The final curation can be done in a more intelligent way compared to brute force analysis of raw data. The layering is important to enable this.

The layering is also important for the control. As part of the control, the control plane is virtualized from layer to layer. Not only can the workflow send control packages specifying what can be captured, like a CaptureMode and capture sequence, but the workflow can also communicate back to the different layers what kind of AI model is appropriate. The layering also affects cost. The more that is done at the lower layers, the less is the total cost of analytics. Layering also reduces latency—how quickly events are detected, analyzed and responded to.

In the example of FIG. 11, a curation service (labelled Scenera Cloud in FIG. 11) enables AI models tailored to specific enterprise verticals to be pushed to the edge layers (camera and sensor) for intelligent capture. In this example, the application is in a specific vertical and the curation service determines that AI Models 1 and 2 are appropriate for the task, as shown in FIG. 11A. These are pushed through the layers to the device layer and sensor layer respectively, as shown in FIGS. 11B and 11C. The curation service may provide sophisticated AI models which utilize the SceneData and SceneMarks to provide automated control and interpretation of events in the enterprise.

Figure 12A:
FIGS. 12A-12D show a use example where AI models are distributed across a network to trigger cameras.
Figure 12B:
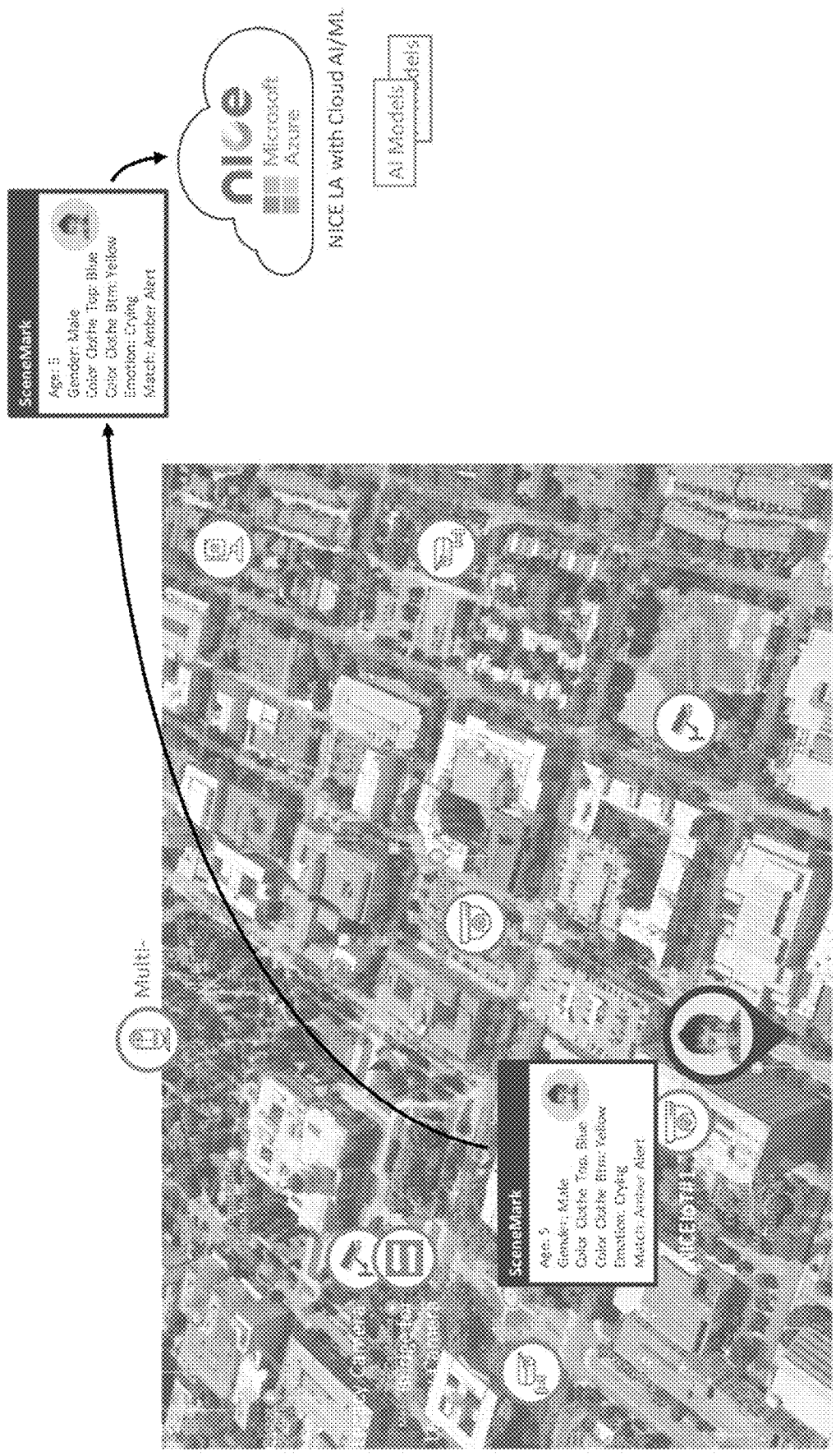
Figure 12C:
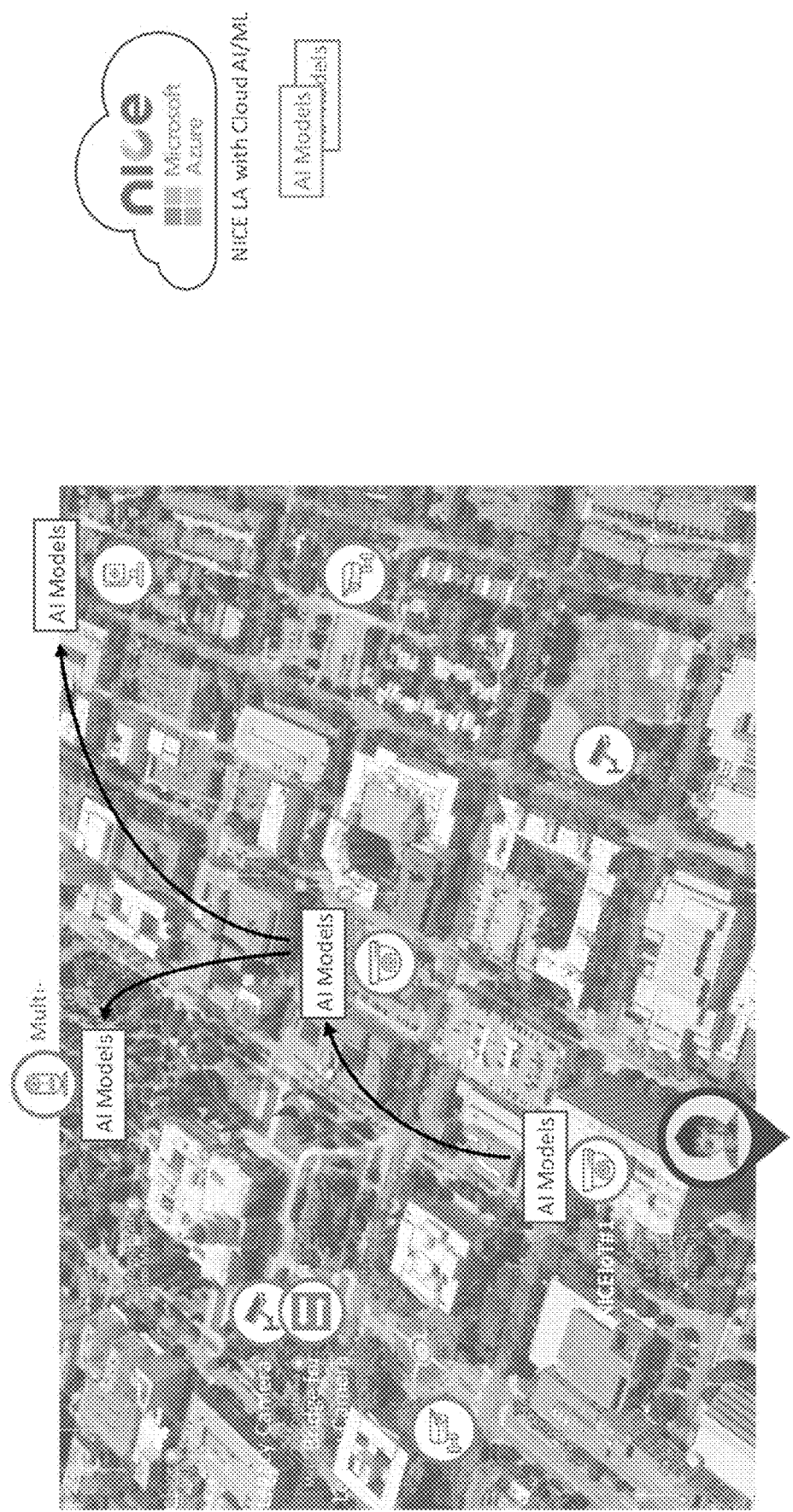
Figure 12D:
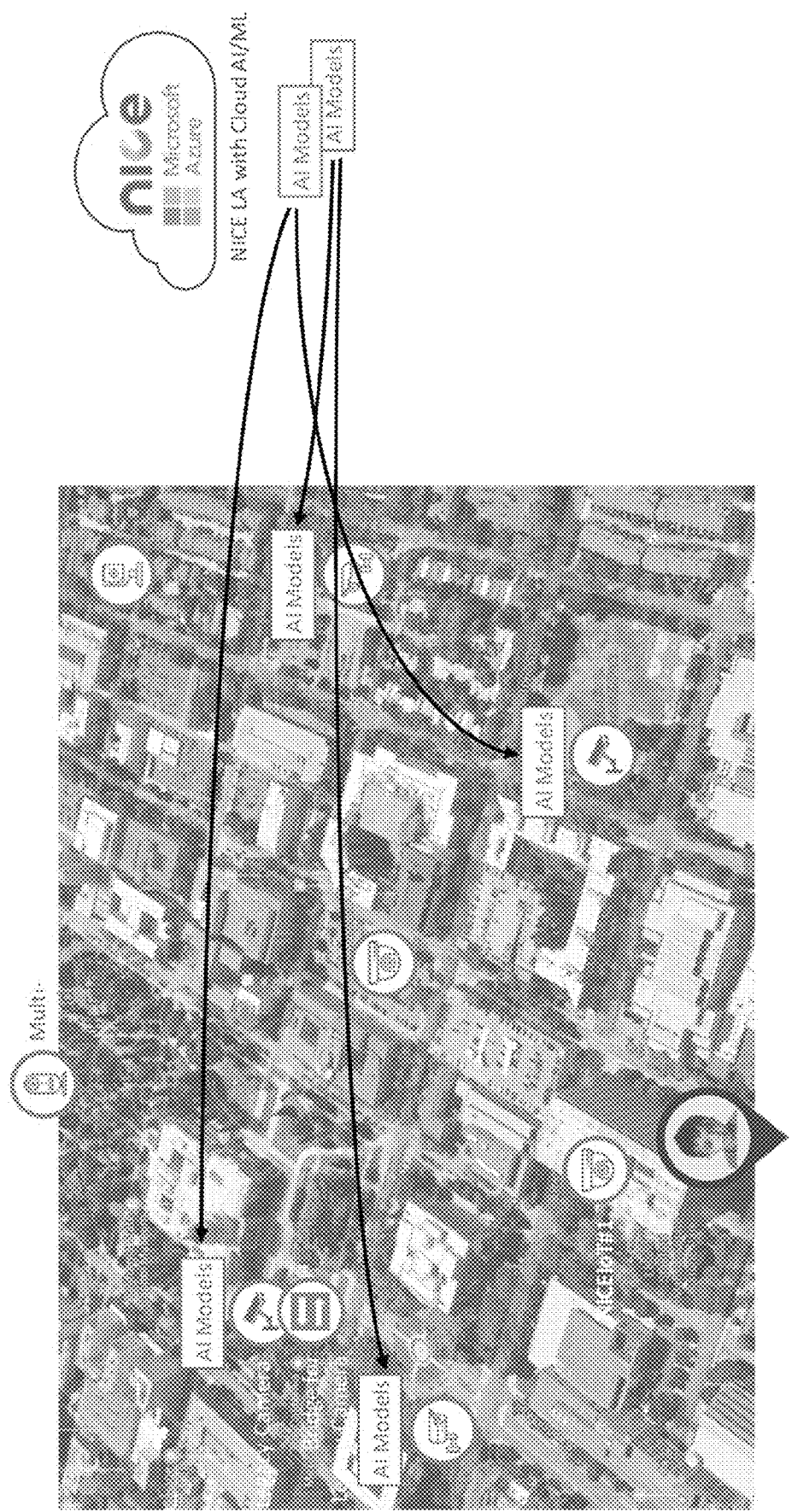

FIGS. 12A-12D show a use example where AI models are distributed across a network to configure cameras. This example is a case of a missing child. In this example, actions are coordinated by a third party service, shown as the NICE cloud in the figures. In FIG. 12A, a missing child is reported. The corresponding AI models to recognize the child are distributed to edge devices in the vicinity of the missing child. The AI models may have been trained a priori, or they may be trained when the child goes missing. The relevant nodes may be identified using the hierarchy of nodes and/or a proximity map of nodes. In FIG. 12B, the missing child is recognized by camera NICEIoT #1. He is traveling in a car. This triggers a SceneMark which is sent to the NICE Cloud for further action. In FIG. 12C, the AI model used by NICEIoT #1, the relevant SceneMark, and license plate number of the car are distributed to nearby cameras with the same AI Model type. Nearby cameras with different AI Model types, may receive AI models for the missing child from the NICE Cloud, as shown in FIG. 12D. All cameras in the vicinity are now ready to identify and track the missing child.

Some features of distributed AI include the following:
 Integration of AI model formats (including ONNX) for distributing AI models to nodes at different layers
 Realtime interaction among nodes in the multi-layer stack
 Defined distribution platform of AI models from training framework to target nodes
 Dynamic distribution of AI models among nodes
  Mapping of an AI algorithm to control data (e.g., SceneMode)
  Application uses control data to select the AI algorithm that is to be used within a node
 Layered and distributed AI with dynamic loading of AI models
  Using control data to configure a meshed network of processing by defining the feedback of the output of nodes to configure other nodes in the hierarchy
 Dynamically loadable AI model at each layer
  Using control data (SceneMark, capture sequence or SceneMode) to activate the AI algorithm
 Distributed AI computing at each layer
  Application triggering the deployment of AI models in the data pipeline using control data (e.g., SceneModes)
 Utilizing the grouping and hierarchy of nodes to distribute metadata packages (e.g., SceneMarks) between nodes, and these metadata being used to configure the nodes
Tracking Sequences This section describes tracking sequences of events based on forwarding SceneMarks that identify events, although the technology is not limited to this particular implementation. The description is divided into three subtopics. First is a description of SceneMarks and what is included with respect to event sequencing. Second is how SceneMarks are used as a communication mechanism. Third is sequence capturing using multiple devices. Defining certain SceneMark attributes and then using SceneMarks as a message for communication among devices leads to efficient sequential capturing of events from multiple devices.

SceneMark Attributes.

Figure 13A:
FIGS. 13A-13C show an example of generating a SceneMark with scene-specific attributes.
Figure 13B:
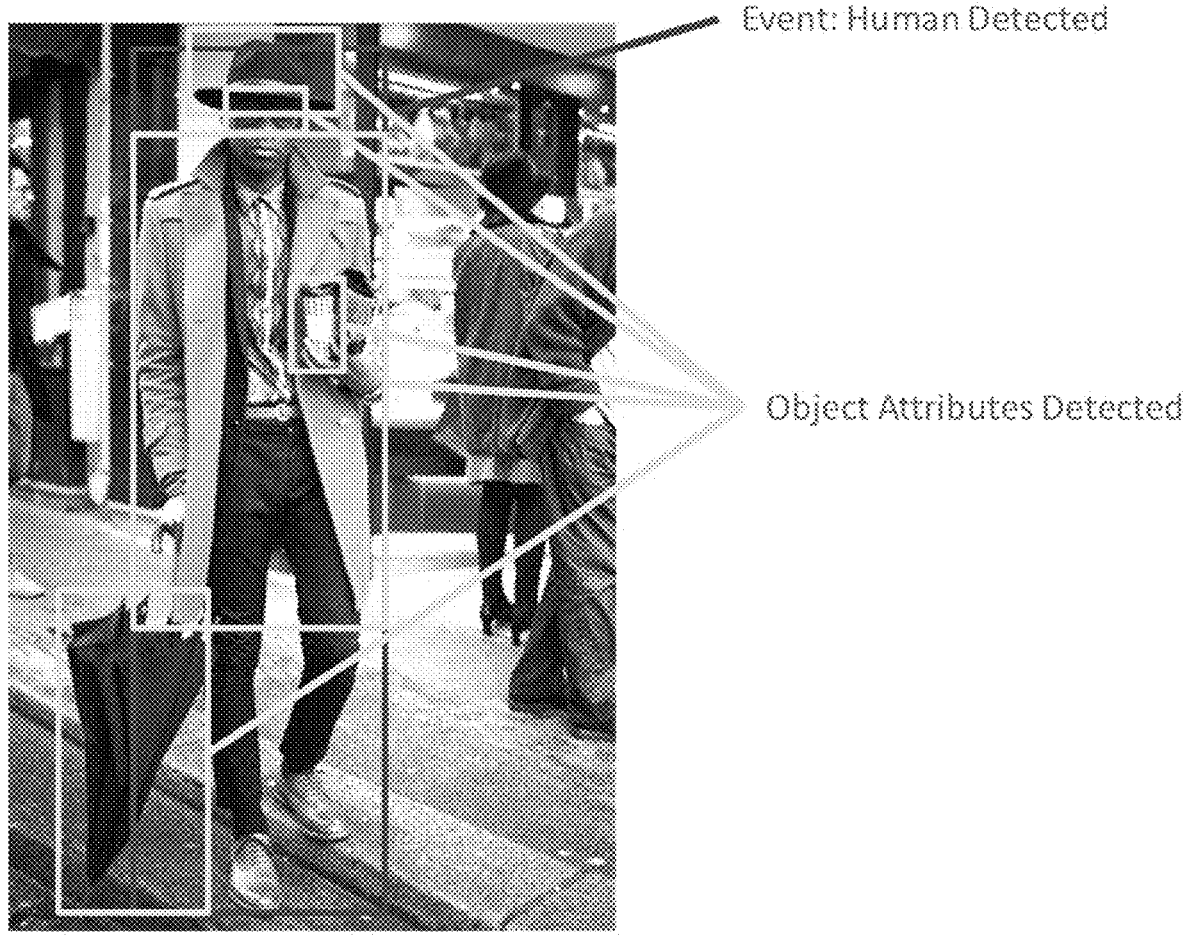
Figure 13C:
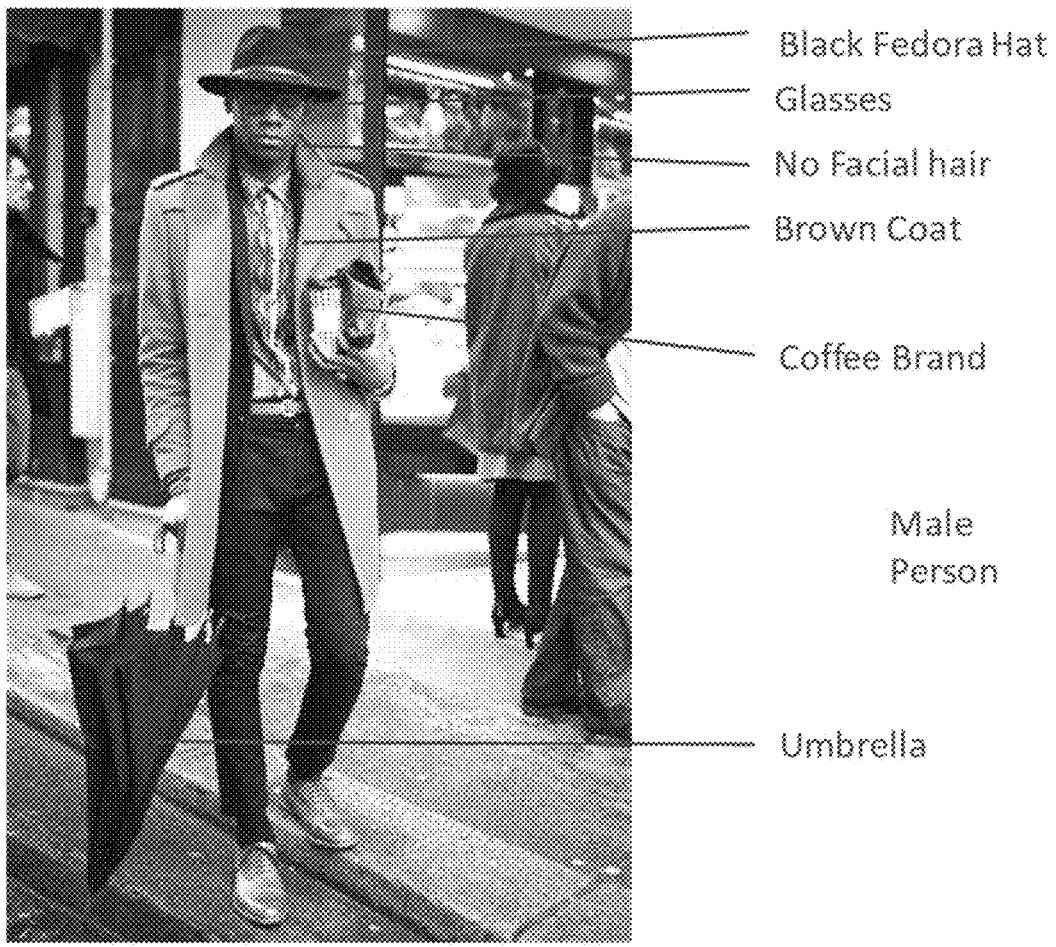

FIGS. 13A-13C show an example of generating a SceneMark and scene-specific attributes. In FIG. 13A, a node detects that a human is present. The associated processing sets a bounding box for the image and generates a corresponding SceneMark. Note that just this workflow may involve several nodes. The camera node may capture the video, a device node may detect the human, and yet another node may set the bounding box. Additional object-specific attributes of the detected object are identified. These are identified by bounding boxes in FIG. 13B and labels in FIG. 13C. This could be done by additional nodes, or the same nodes running different AI models. They could also be built up through hierarchy. For example the attribute "Male Person" may result from the detection of multiple different lower level male attributes. These attributes provide additional description or context for the event triggering the SceneMark. In this case, they are further descriptions of the detected human. This aids in image understanding. They are not to be confused with more generic SceneMark fields, such as timestamp, camera ID, or SceneMark ID. They may be referred to as xxx-specific or xxx-descriptive attributes, where xxx is an object, human, scene, activity or whatever triggers the event.

These attributes may be extracted using machine learning, for example a CNN which produces a vector. The attribute is effectively encoded into the vector, typically in a manner that is not understandable to humans. For example, the color of a person's jersey may be encoded as certain numbers or combinations of numbers in the CNN's 256-number vector. The CNN encodes the data in this way as a consequence of the training process that the network has undergone to differentiate between people.

Figure 14A:
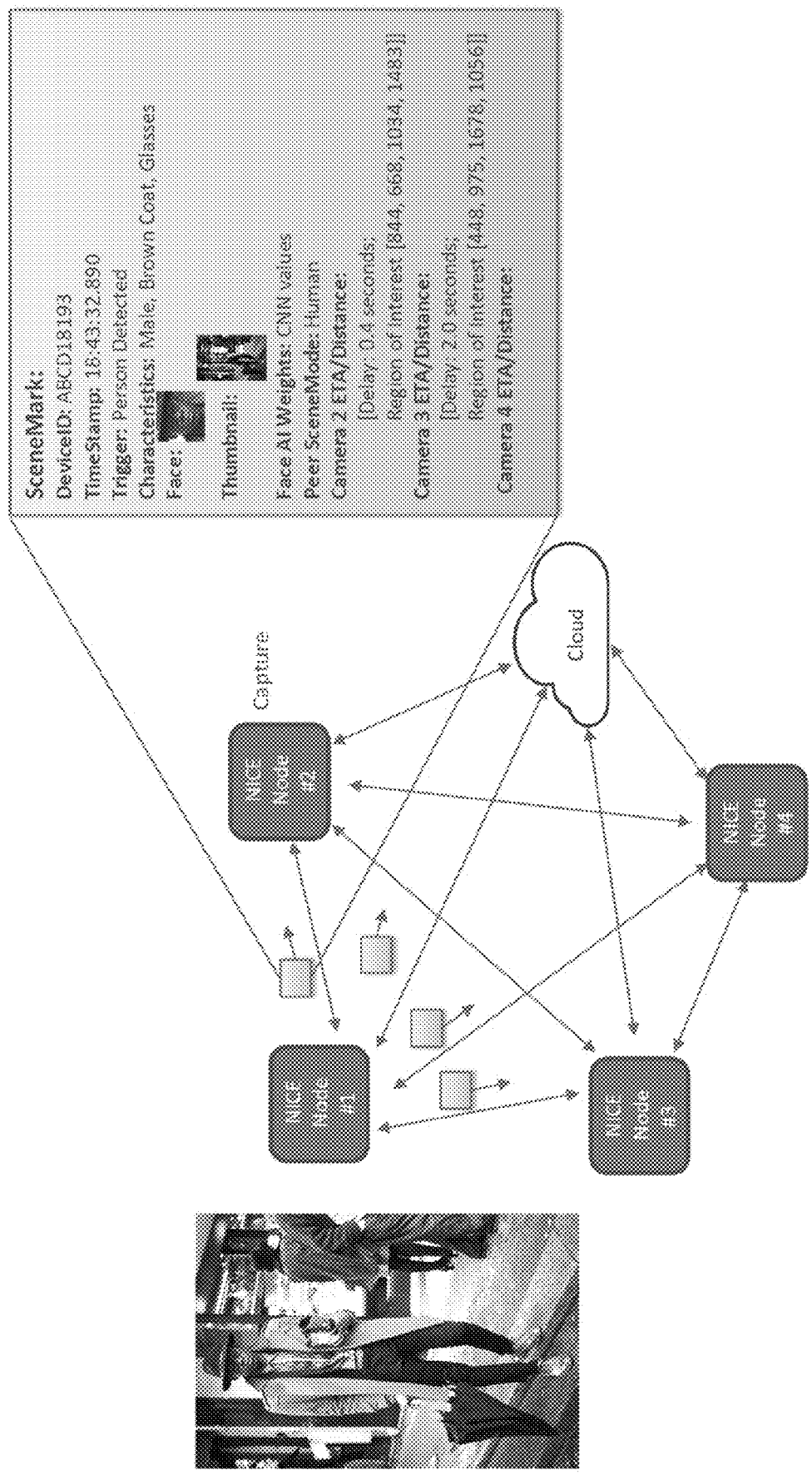
FIGS. 14A-14B show distribution of the SceneMark to neighboring nodes.
Figure 14B:
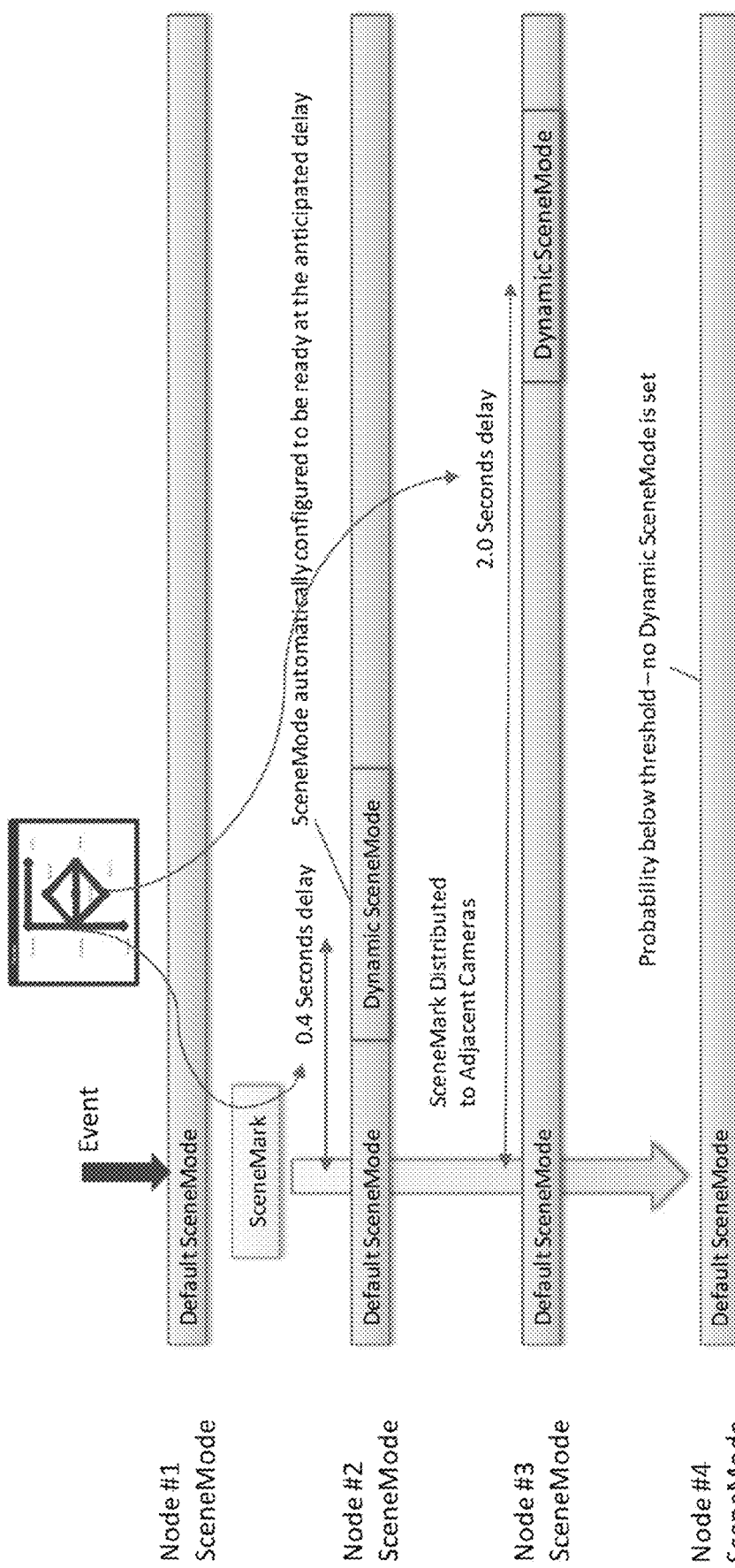

These object-specific attributes (such as encoded in CNN vectors) are added to the SceneMark, as shown in FIG. 14A. FIGS. 14A-14B show distribution of the SceneMark to neighboring nodes. The SceneMark is sent to neighboring nodes (cameras) to help track the same person. If the person shows up in a camera's view facing the camera, then the camera can see his face and he may be recognized on that basis. If a different camera sees him from a different angle, then that camera may not see his face. All that camera can see is maybe the umbrella, hat, and coat. So it is useful for the SceneMark to collect these attributes. They can then be sent to other cameras to help other cameras recognize the same person, perhaps not by face recognition, but by one or more of these other attributes. For example, say that the SceneMark includes five different attributes: hat, umbrella, what he is holding, color of his coat and color of his shoes. These attributes may be used to identify the same person viewed by other cameras. Maybe the criteria is that if three of five attributes are present, then it is considered to be the same person. Or the analysis may result in probabilities that the same person is present. Decisions may also be made by multiple cameras working together, including using information from a proximity map. If the other cameras detect the same human, they may generation additional SceneMarks (preferably that refer back to the original triggering SceneMark) and/or they may modify the original SceneMark with additional information.

The mechanism for distributing these attributes may also take the form of a vector generated by a CNN or by distributing the images themselves or at least the parts of the image corresponding to the identified person. For example, in the case of face recognition and re-identification, a CNN may be used to generate an intermediate representation which can be compared with the intermediate representation of the reference face or person. For example a detected face will be used as input to a CNN, and the CNN will output a vector of 256 numbers. This vector will be compared against vectors for reference faces, and if the distance is below a defined threshold, the two vectors will be considered to have been matched. If the two vectors are considered matched, then the face that has been captured is considered to be the same as the reference face. Similarly for re-identification, a vector may be generated for the detected person and the vector is compared to the database of reference vectors corresponding to previously identified persons. These intermediate values may be passed between nodes to speed up the processing and reduce the amount of data that is passed between nodes. These intermediate values may also be combined into the SceneMark as an attribute.

FIG. 14B shows configuration of neighboring cameras triggered by receipt of the SceneMark. In this figure, the cameras are referred to as nodes and, in general, this approach may be used with any components (nodes) in the workflow, not just cameras. The Tube Map is used as a mechanism whereby, when one node detects an event or trigger, the workflow uses the Tube Map to determine nearby nodes and schedules different SceneModes or capture sequence configurations for the nearby nodes. The SceneMark triggers the receiving nodes to be optimally configured to capture the person or object of interest. Appropriate AI models, for example for the different attributes, may be loaded onto the receiving nodes. The Tube Map can also provide the expected probability of the human detected by camera #1 then appearing in the neighboring cameras, and the expected delay to go from one camera to the next. This allows the workflow to anticipate the person appearing and to set up the correct SceneMode for that window of time. In FIG. 14B, the human is detected by camera #1, which is the red arrow. This generates a SceneMark, which is used to notify other cameras, which can then switch from a default SceneMode to a more appropriate SceneMode during the expected window of arrival. In FIG. 14B, node #2 (e.g., the closest nearby camera) switches to the alternate SceneMode after 0.4 second delay, node #3 switches after 2.0 second delay, and node #4 does not switch at all because the probability is too low. This business logic may reside in the nodes themselves, consistent with the layering approach.

Some features of SceneMark attributes that facilitate event tracking include the following:
- "Scene-specific" attributes field. These are fields that provide further description or context of the event that triggered the SceneMark.
- "Trigger" field. Defines what actions should be triggered in the receiving node, such as:
  - Configuration (SceneMode) to be used. Also timing of the configuration, for example when to start and end the configuration.
  - Scene-specific attributes to be checked
- "Triggered By" field. Indicates which earlier SceneMark triggered the generation of the current SceneMark.
- Trigger configuration of adjacent nodes based on data carried in SceneMark
  - Using SceneMarks to trigger the SceneMode in nearby nodes
  - Using information from the Tube Map to time the triggering of the SceneMode in nearby nodes
  - Carrying data from the Tube Map in the SceneMark to enable other nearby nodes to determine he timing that they should use when switching their SceneMode in response to the SceneMark
  - Providing characteristics in the SceneMark that can be used as input to the AI algorithm selected in the SceneMode
  - Providing an image from the SceneMark that can be used as input to the AI algorithm selected in the SceneMode Nearby nodes calculate time and place to capture target image
> Each node has a copy of the Tube Map stored in its memory. When the Node receives the SceneMark, it uses the Tube Map to calculate the appropriate timing of its response Appending information in the SceneMark generated by a SceneMode triggered by a first SceneMark. This information may include:
> Attributes that caused the trigger
> SceneMode
> Reference to the first SceneMark that triggered the SceneMark SceneMarks for Communication.

SceneMarks may be defined with "Trigger" and "Trigger By" fields. These SceneMarks may be used for communication. Communication depends on the network structure of the nodes.

Figure 15A:
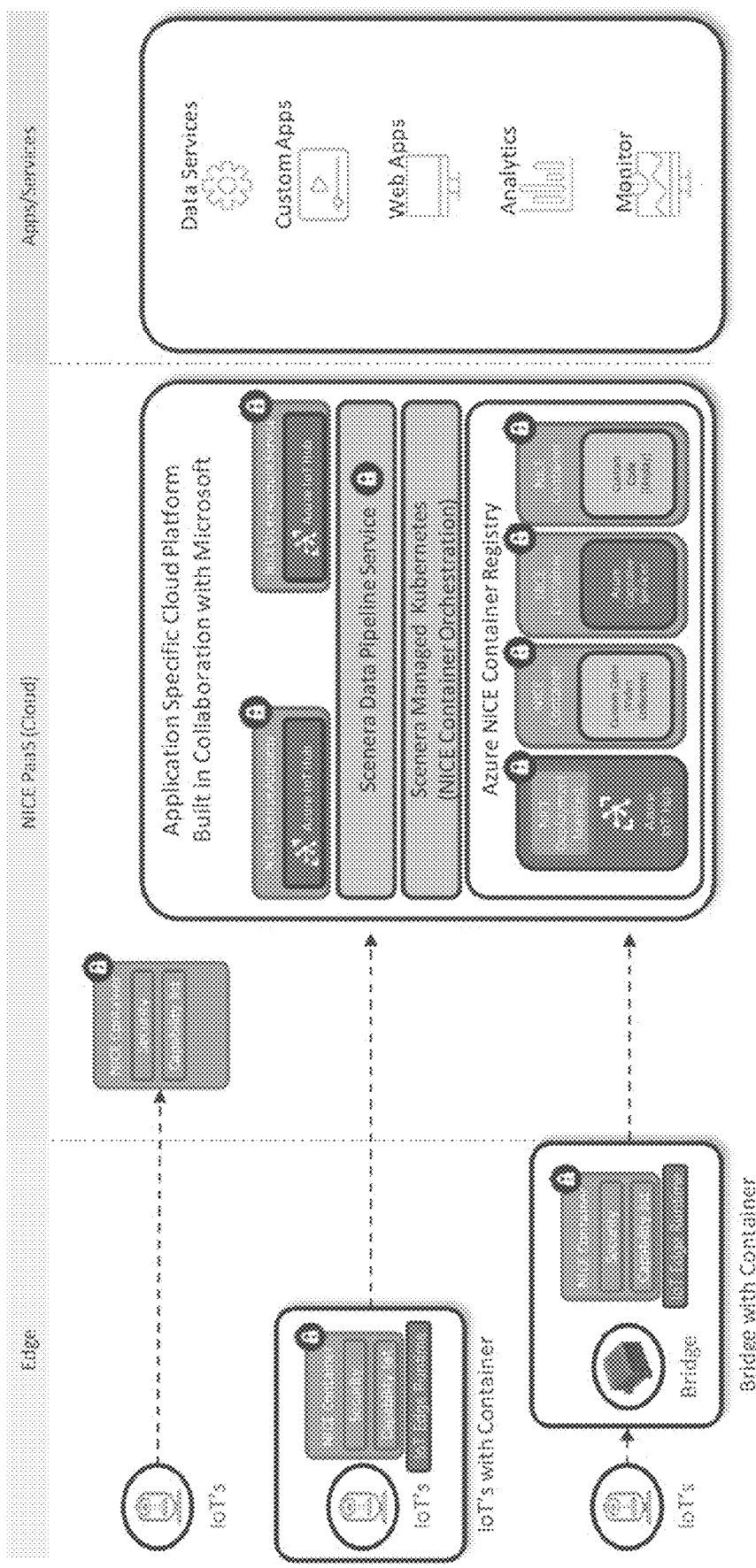
FIGS. 15A-15B show containerization of nodes.
Figure 15B:
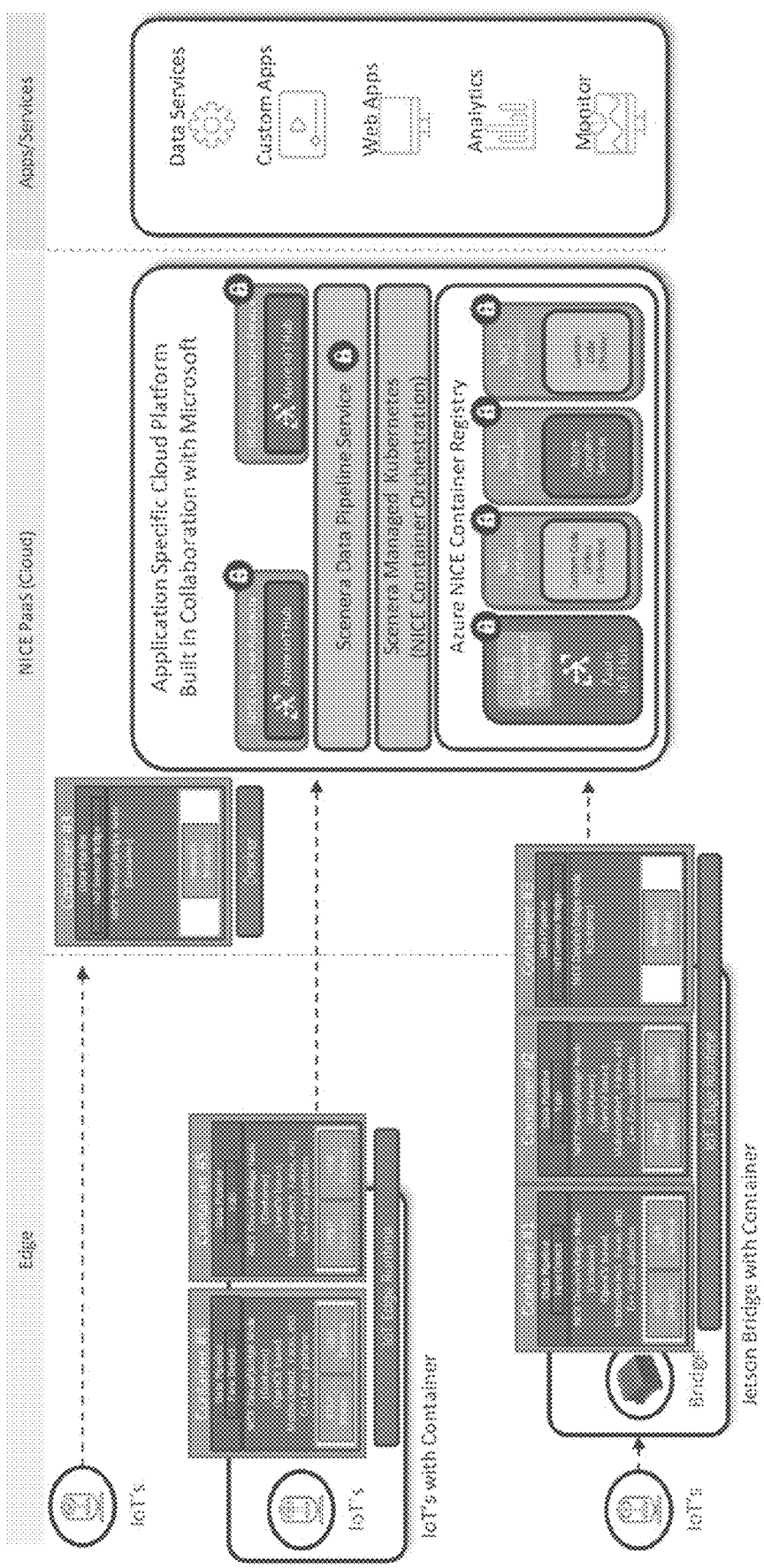

In the example of FIGS. 15A-15B, the multi-layer technology stack is implemented using containers. The different nodes are containerized. Different functional components in the stack are represented as containers. The container has a definition of the node, and the container writes the representation of the node as what is running to the cloud. An edge device with no processing capability is shown on the top left as container #3 in FIG. 15B. Middle left is some IoT with some processing capabilities and some analytics. It is defined by containers #4 and #5. The bottom left IoT is connected to a bridge device, and these are represented by containers #1, #2 and #3. What is running on the cloud is also containerized.

Nodes may also be organized into groups and hierarchies, as described previously. For example, in the hierarchy of FIG. 5B, SceneMark messaging may occur within a group, directly between groups (e.g., via a gateway between the groups), or indirectly between groups (e.g., via the cloud).

Figure 16A:
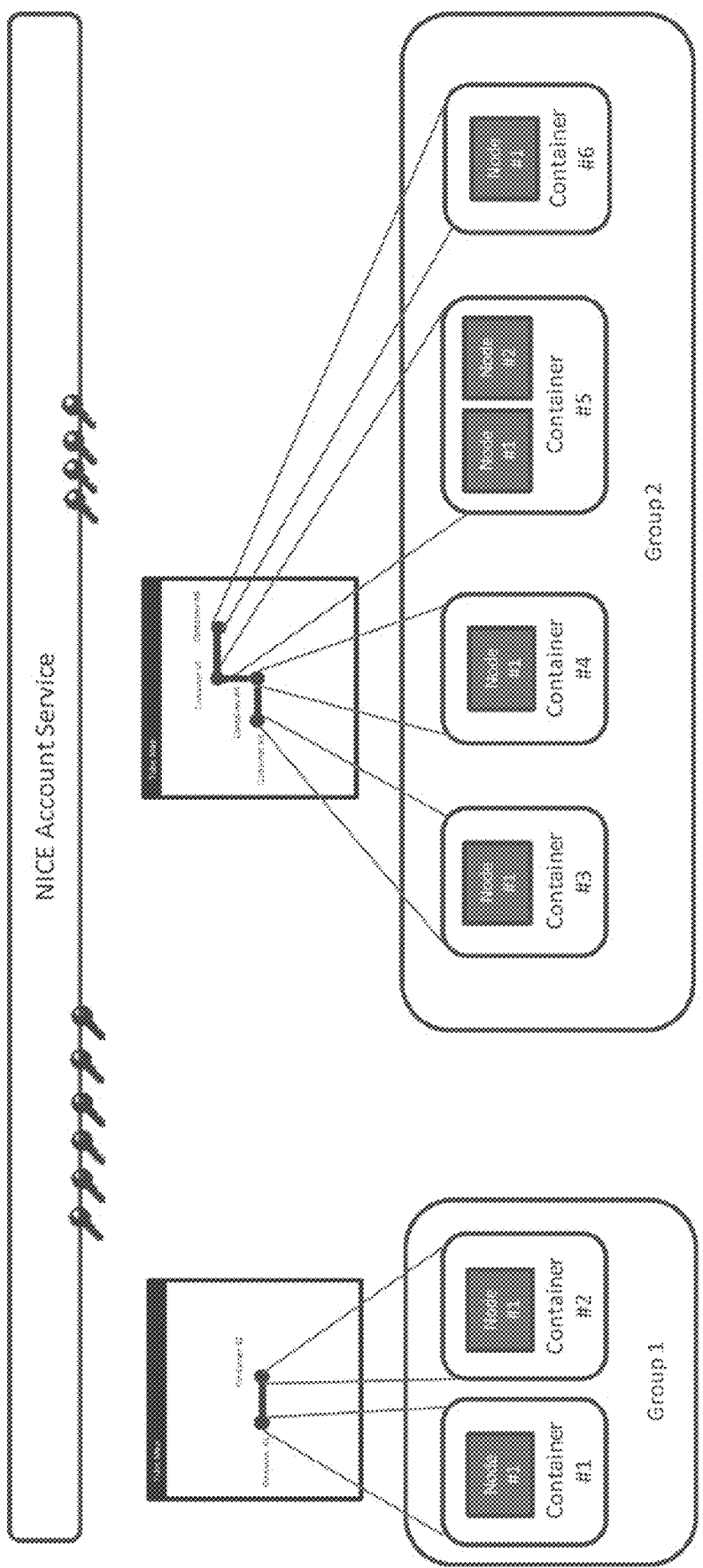
FIGS. 16A-16D show secure communication between nodes.
Figure 16B:
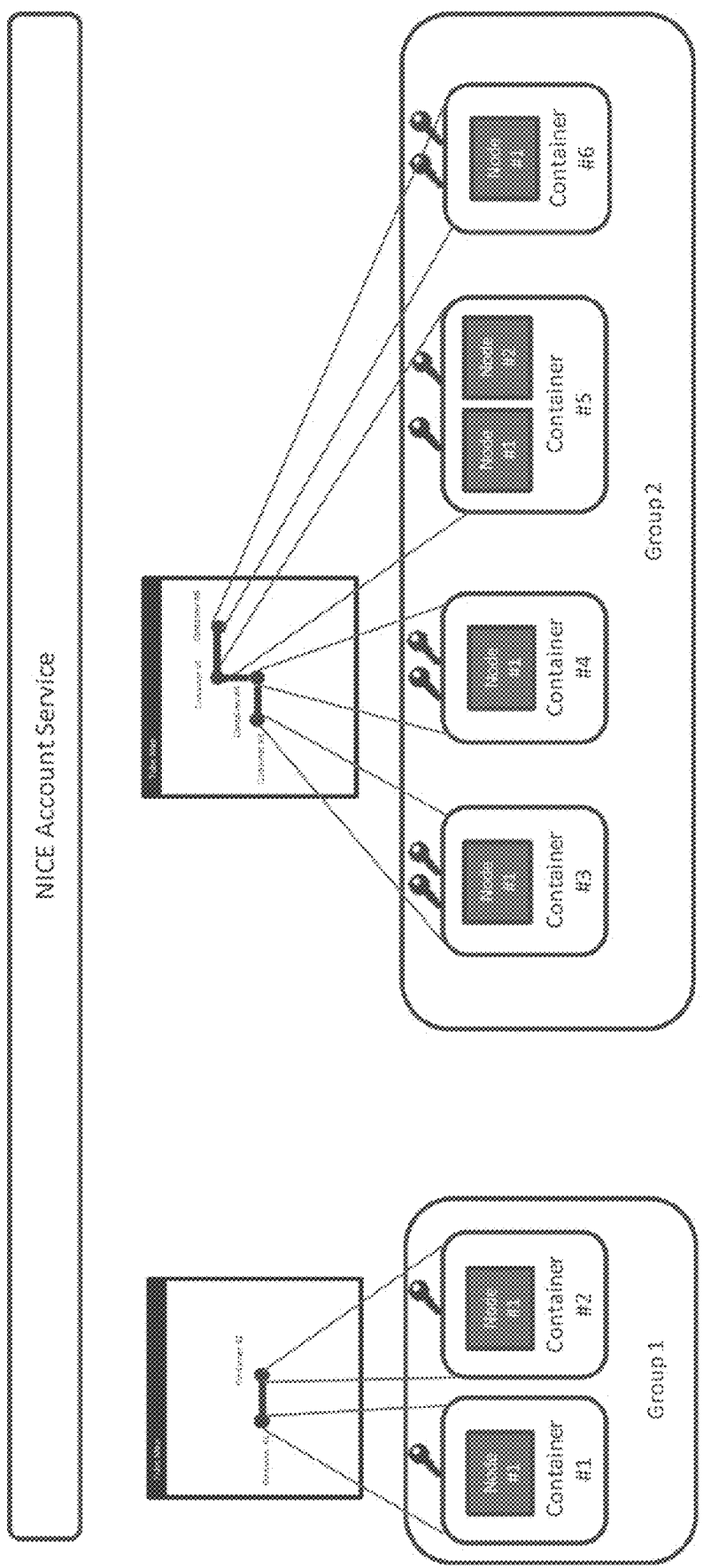
Figure 16C:
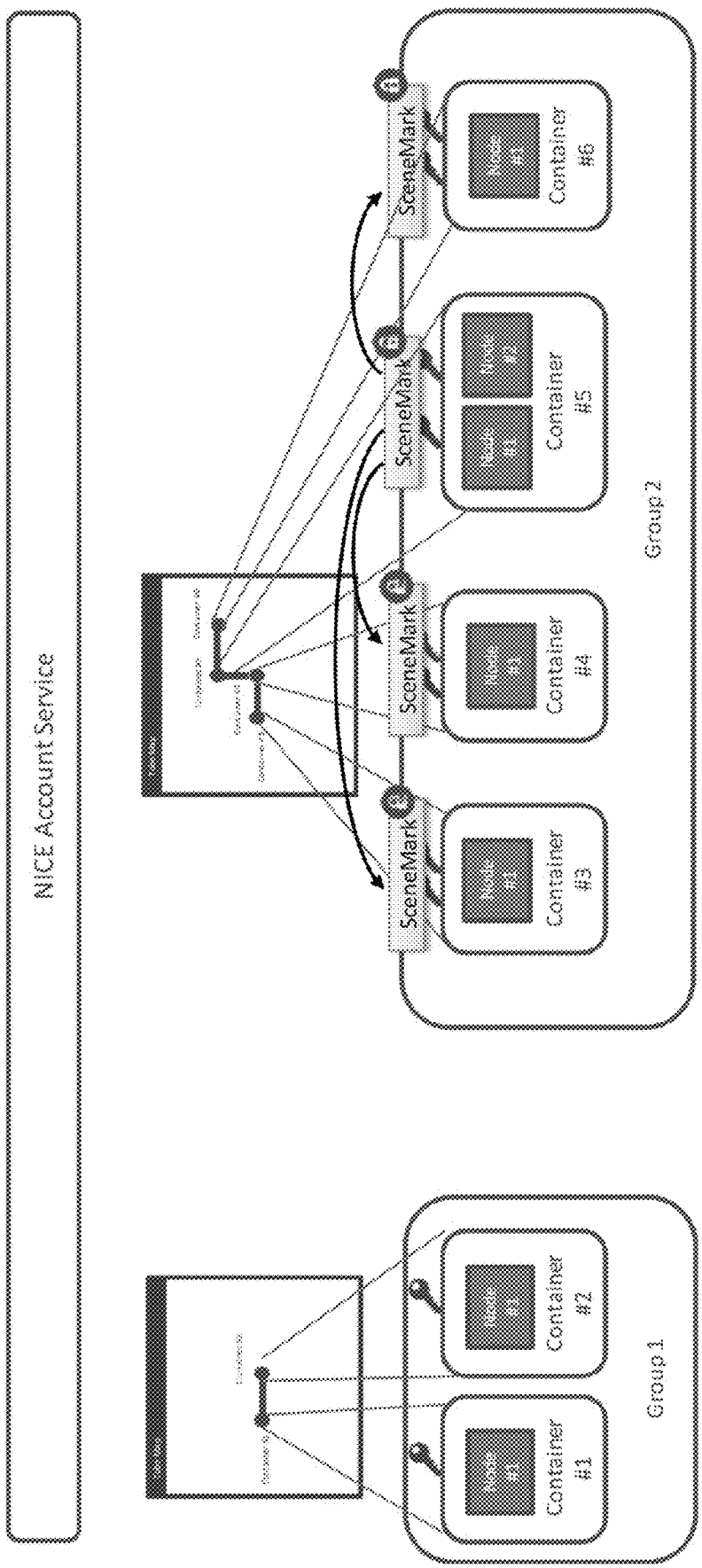
Figure 16D:
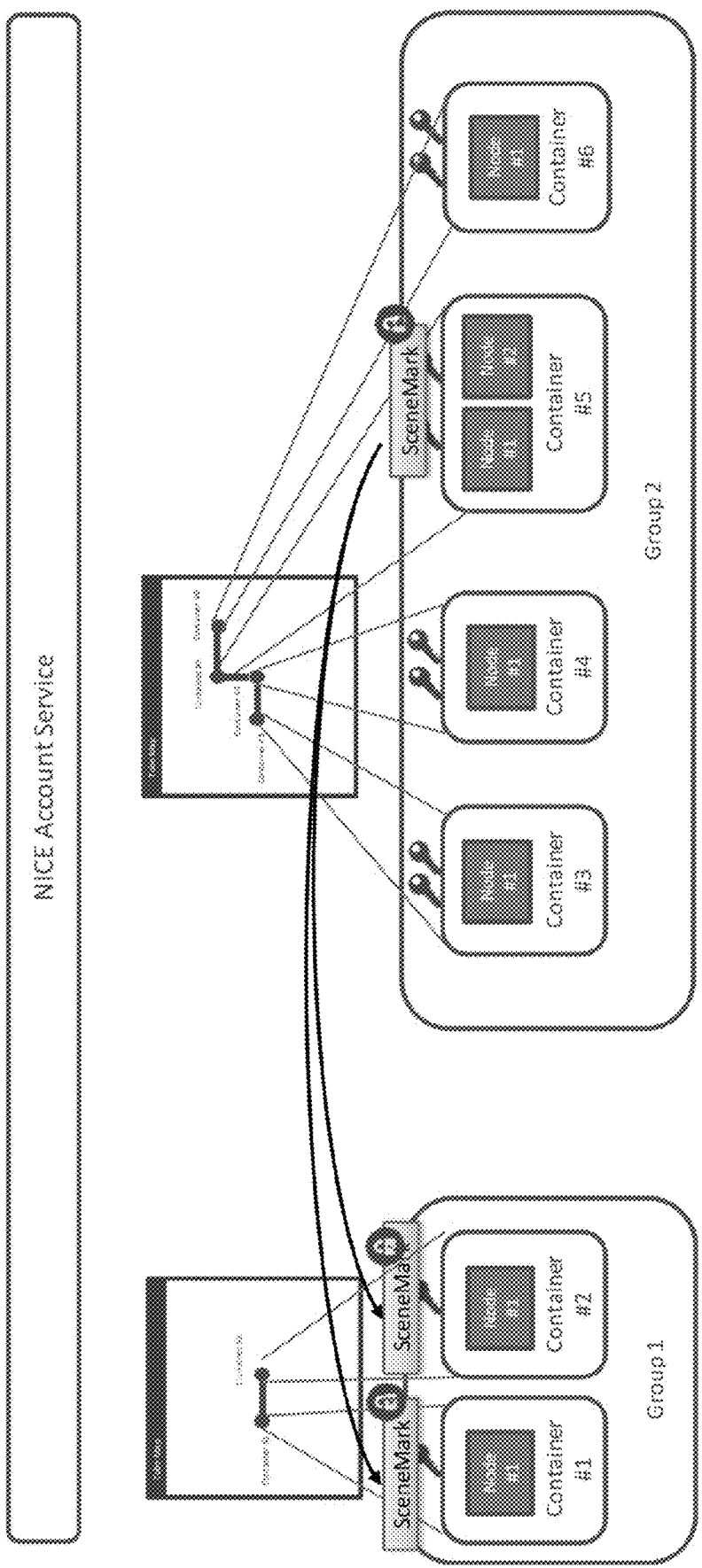

FIGS. 16A-16D show an overlay of security. By using a privacy management system (NICE account service in FIG. 16), encryption keys may be shared using a broadcast mechanism whereby the same keys are shared to different nodes. In FIG. 16A-16B, the privacy management system distributes red keys to some nodes and blue keys to other nodes. The blue keys are kept within group 2, while the red keys are shared with nodes of both groups. Nodes can share information between them using the shared keys. They can also create groupings by using different keys to protect information. In FIG. 16C, the blue SceneMark is protected with the blue keys and distributed to nodes within group 2. In FIG. 16D, the red SceneMark is protected with the red keys and is distributed from group 2 to group 1.

Some features of SceneMark communication include the following:
> SceneMarks used as message in communication between nodes
> Define key distribution scheme to secure communication within group and across groups
> Secure communication within and across groups
>> Using a privacy management system to manage the distribution of models to different nodes
>> Using a privacy management system to distribute keys to nodes. The node uses the key to decrypt and verify information, such as an AI model
>> Using a privacy object to distribute keys. The privacy object contains rules for using the AI model, for example the number of times the model may be used, the time window for usage and other usage models
>> Using the privacy management system to manage the distribution of intermediate representations or vectors that are generated for comparing objects, faces, people etc with reference vectors for objects, faces and people
> Communication among nodes within a group and across groups
>> Distribution of SceneMarks between nodes using the group structure Sequence Capturing Using Multiple Devices.

Figure 17A:
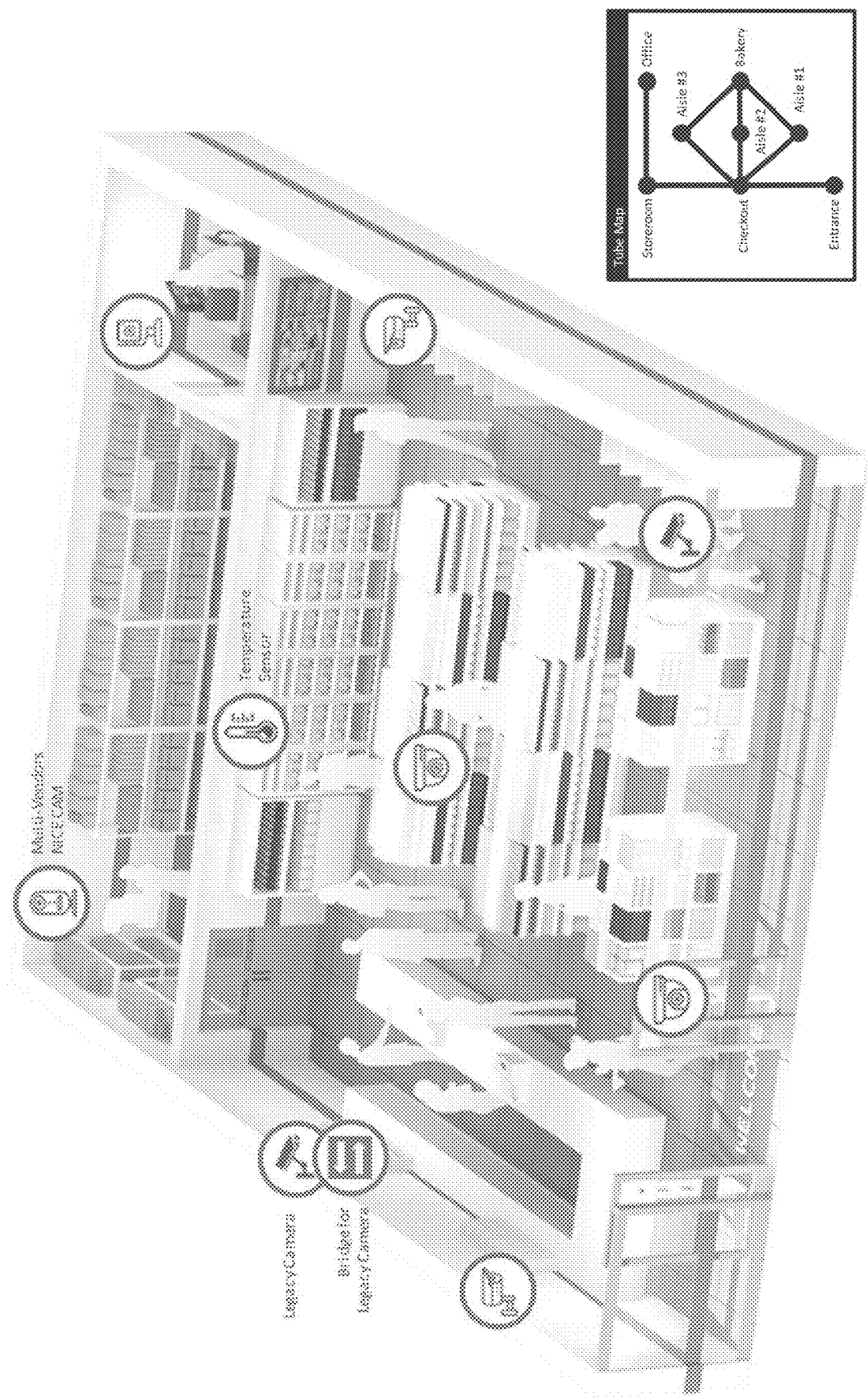
FIGS. 17A-17D show an example of sequential capture of related images based on SceneMarks.
Figure 17B:
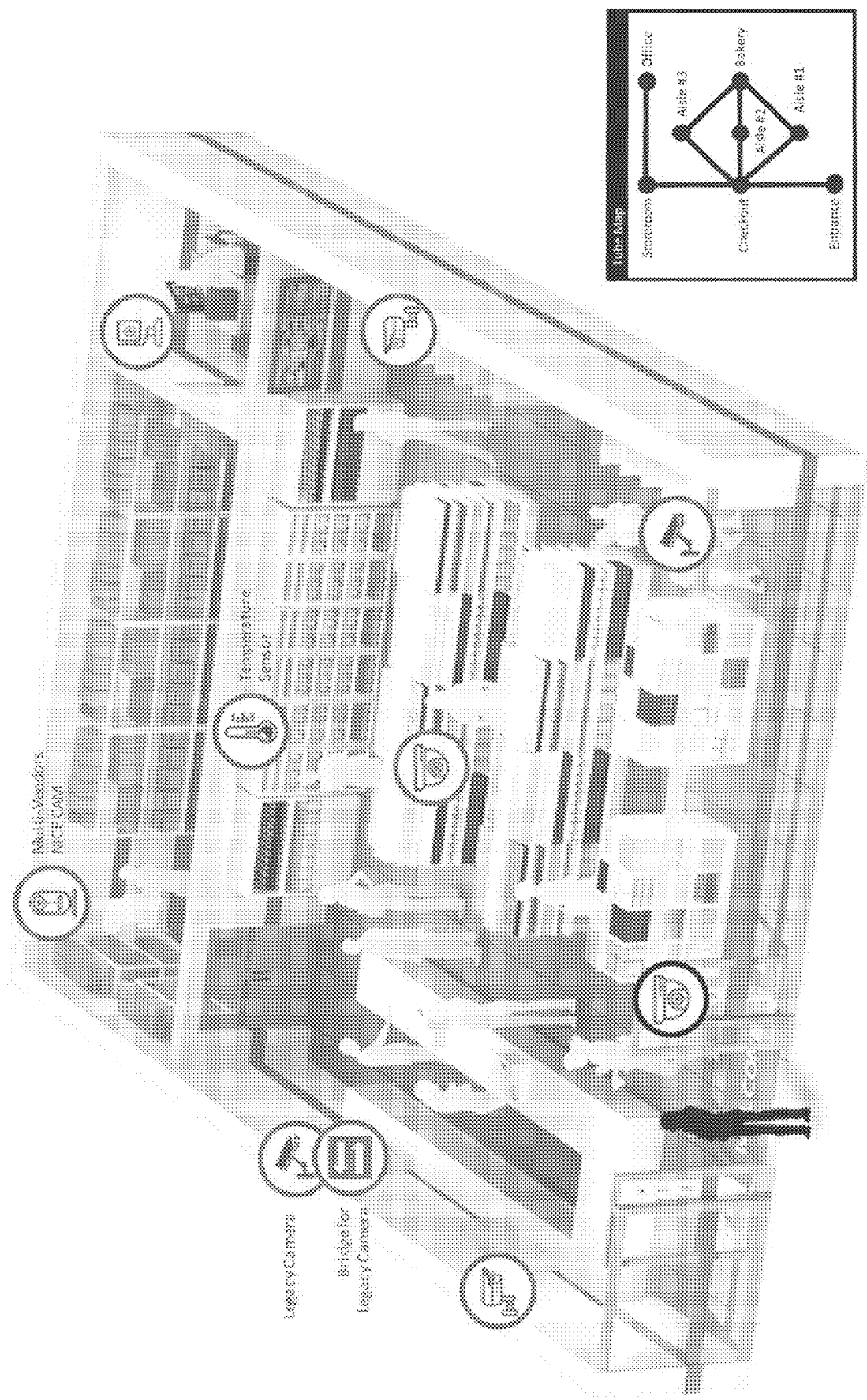
Figure 17C:
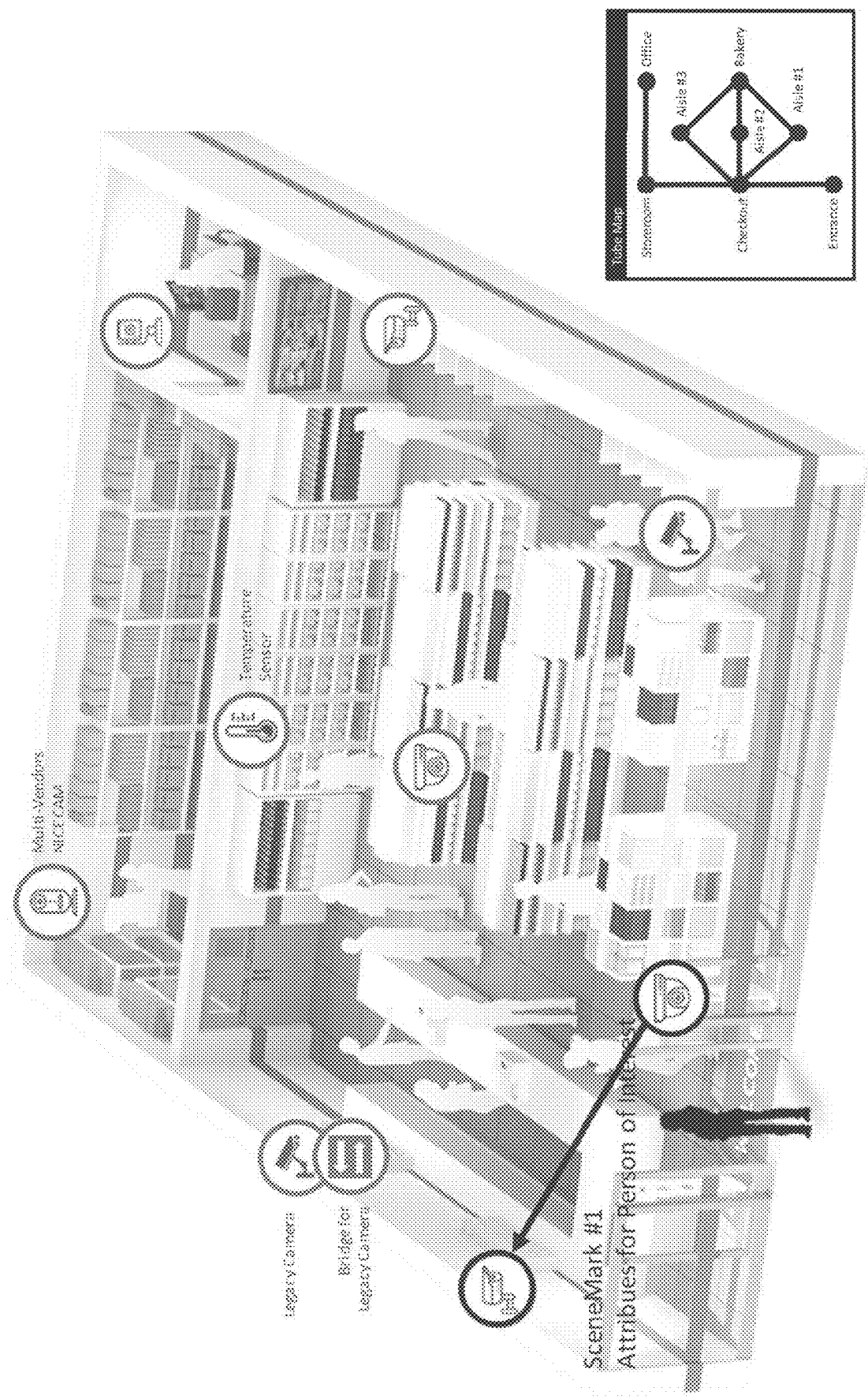
Figure 17D:
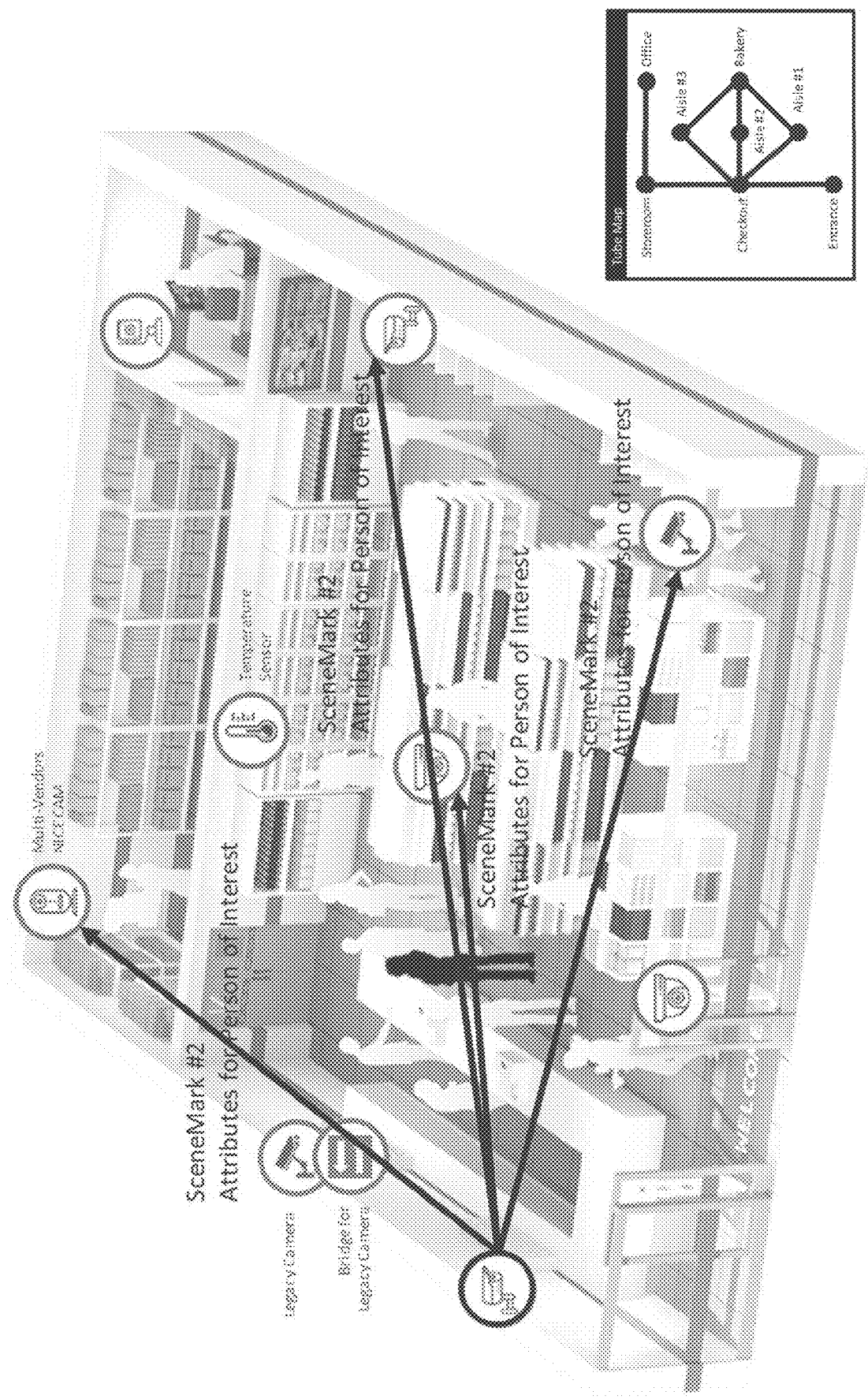

FIGS. 17A-17D show an example of sequential capture of related images based on SceneMarks. As shown in FIG. 17A, a retail store has an entrance and many aisles. Most customers come in through the entrance and browse through the store looking for certain products. Maybe they will go to the bakery section, and then they go to the refrigerator section and then they come to the checkout section to pay. The retail store is monitored by different cameras and sensors, and there is a Tube Map that shows the relative camera locations. When a person enters (FIG. 17B), the entrance camera detects that and a SceneMark is generated. This SceneMark is used to notify other cameras in the vicinity, according to the Tube Map. FIG. 17C shows notification of a checkout camera when a SceneMark is generated by the exterior entrance camera, because that is the only possible path for the person. FIG. 17D shows notification of multiple possible next cameras, for the SceneMark generated by the checkout camera. Upon receiving the SceneMark, the cameras that receive the forwarded SceneMark may capture SceneData relevant to the particular event. This is helpful because other cameras are now expecting this person and can tailor their data capture and processing. For example, if the person is already identified, it is easier for the next camera to confirm it is the same person than to identify the person from scratch.

The configuration of cameras triggered by SceneMarks may occur as described previously in FIGS. 14A-14B.

Figure 18A:
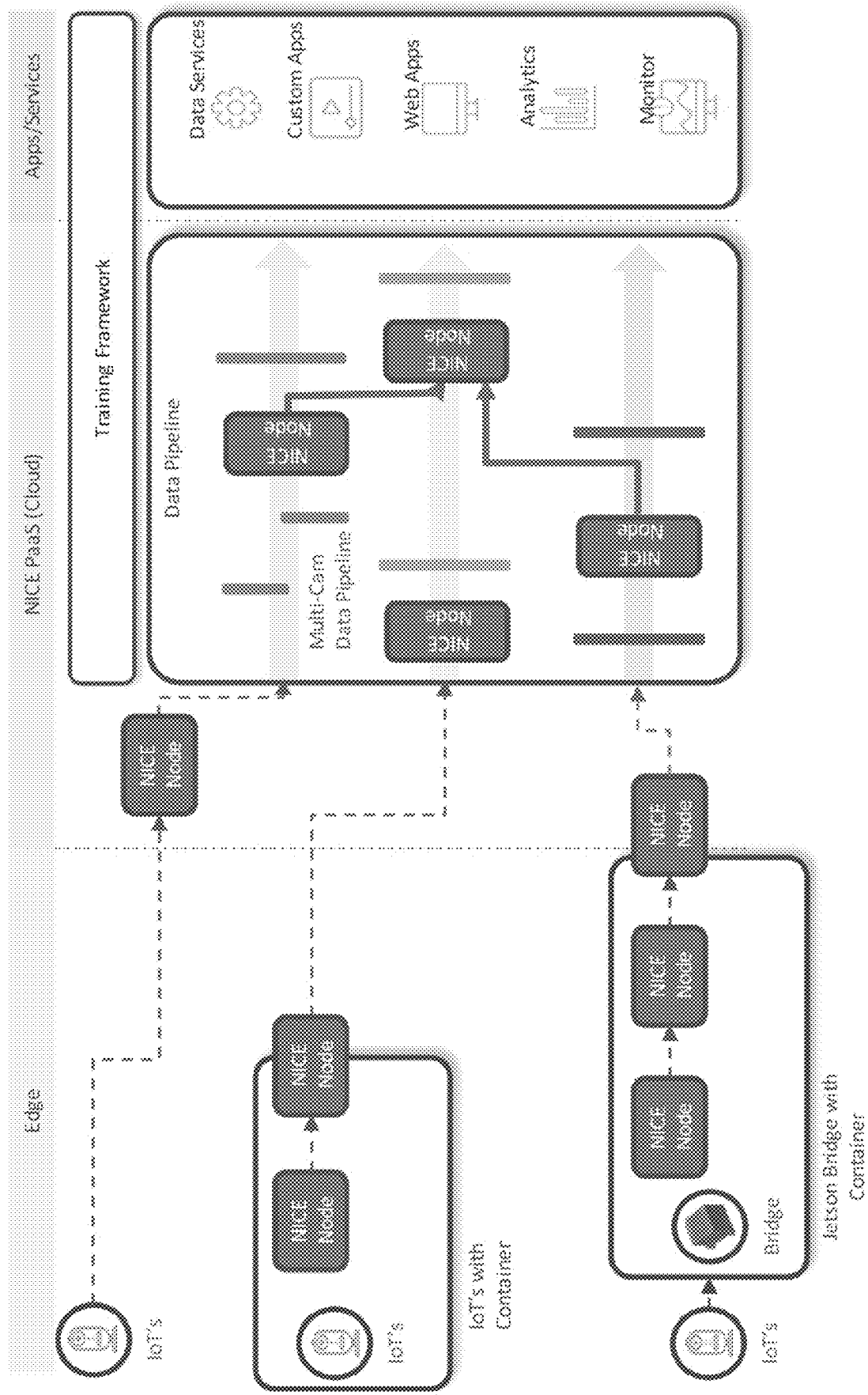
FIGS. 18A-18C show a sequence for structuring SceneMarks.
Figure 18B:
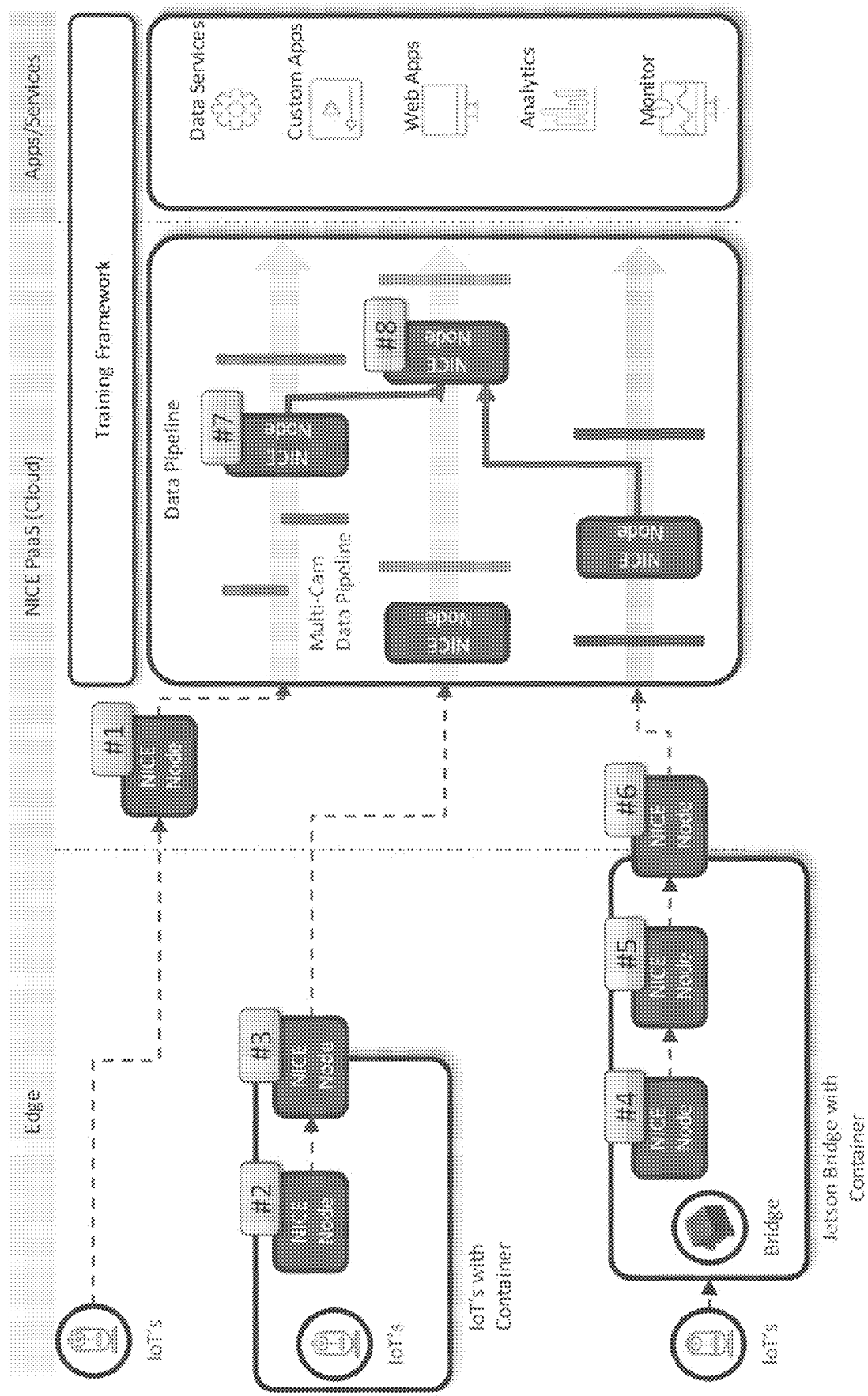
Figure 18C:
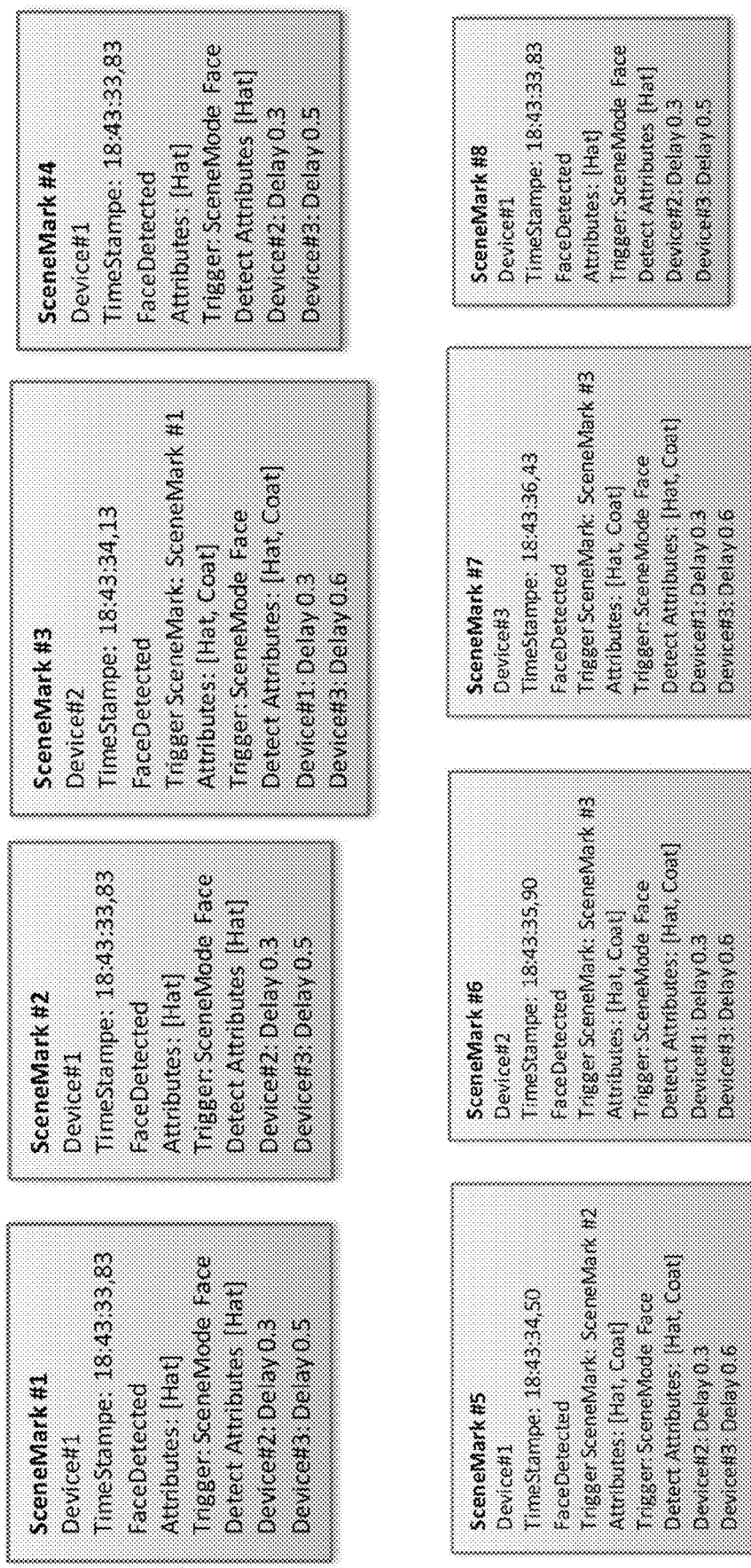

FIGS. 18A-18C shows a sequence for structuring SceneMarks from multiple cameras. FIG. 18A shows a multi-layer technology stack with multiple nodes in blue. FIG. 18B shows events #1-8 detected by nodes in the stack. Each event generates a SceneMark, as shown in FIG. 18C. Some SceneMarks trigger other nodes to capture SceneMarks. These SceneMarks serve as notifications to other nodes to set up their dynamic SceneModes, and those SceneModes generate their own SceneMarks. For example, SceneMark #3 is triggered by SceneMark #1, as indicated by the Trigger SceneMark field. This creates a summary of events in the form of a linked list of SceneMarks which are generated by some initial trigger plus the subsequently generated SceneMarks.

Figure 19:
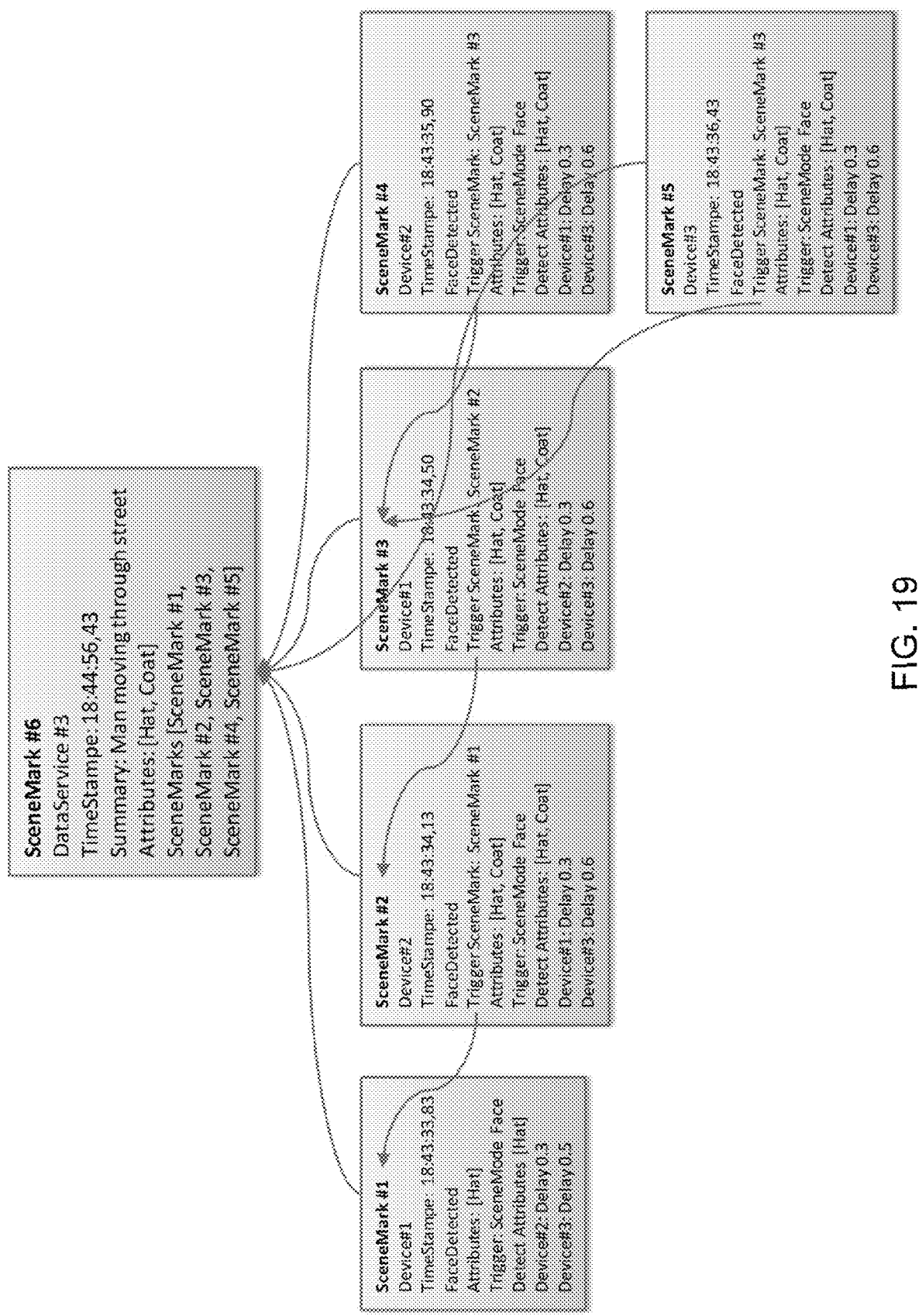
FIG. 19 shows an event summarized by structured SceneMarks.

These linked lists of SceneMarks may be analyzed and summarized. They can provide a summary of events, as shown in FIG. 19. They may generate a summary of SceneMarks associated with the event and may also have a description of the event that occurred. In FIG. 19, SceneMark #6 is created by a higher-level node. It analyzes SceneMarks #1-5, which were generated by lower level nodes. SceneMark #6 lists the underlying SceneMarks #1-5 but also summarizes them. It is a higher order SceneMark.

The generation of SceneMarks are typically triggered by an analysis sequence. It could be an analysis SceneData (sensor data), such as detecting motion or detecting a person. It could also be an analysis of other SceneMarks (metadata), such as detecting a sequence of four or five SceneMarks with a particular timing between them and between different nodes with certain events in the SceneMarks, that could then become a trigger for a higher level SceneMark. Certain recognized patterns of lower level SceneMarks can trigger the generation of higher level SceneMarks.

Figure 20:
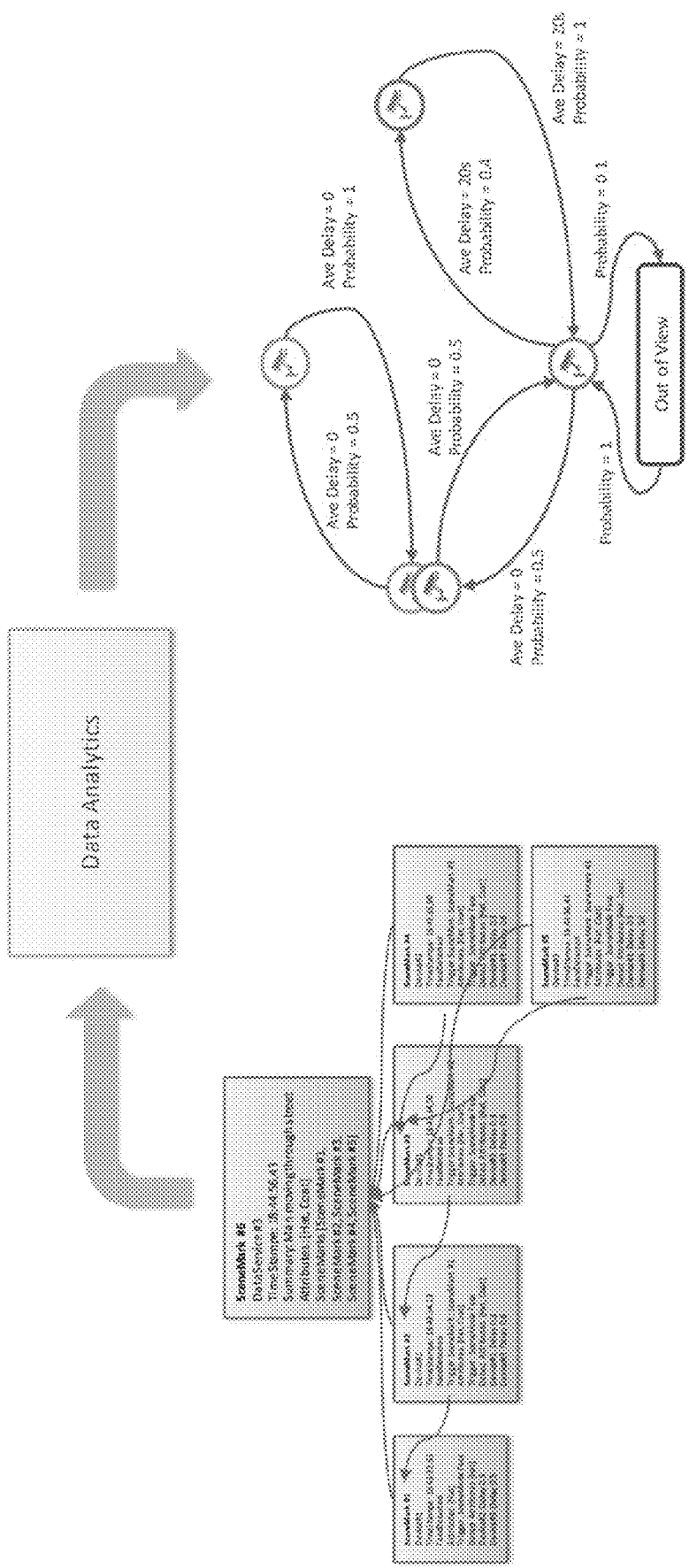
FIG. 20 shows analysis of SceneMarks to determine relationship of cameras.

As shown in FIG. 20, SceneMarks that are accumulated over time may be used to update other parts of the workflow. In this example, chains of SceneMarks are fed into an analytics engine. SceneMarks intrinsically have information about the spatial and time relationship between nodes, including cameras. Data analytics analyzes the SceneMarks to derive the relationships between nodes, such as the probability that an object appearing in one camera will then appear in a neighboring camera or the delay from one appearance to the next. This builds the overall understanding of the relationships among different sensors. The data analytics could include machine learning. SceneMarks accumulated over time could be used as a training set for machine learning. The machine learning can then be used to estimate probability and delay between nodes.

Analysis of SceneMarks can also determine what kinds of AI models or AI processing is appropriate for devices. This additional information can then be sent to the devices as part of the workflow control package, such as in the Capture-Mode or capture sequence. Some sensor and devices have capability to do some analysis for certain analytic models. For example, AI models may be transmitted to the sensors and devices using industry standards, such as ONNX.

Some features of sequence capturing include the following:
  Using a proximity map (e.g., Tube Map) to determine triggering of nodes
  Proximity map includes timing information of delay between event happenings among nodes
  Defined mechanism to allow timing information to be used to set configuration of other relevant nodes
  SceneMark data structure incorporates relationship between first SceneMark and subsequent SceneMarks captured in response to the first SceneMark
  Defined data structure for big data associated with the capture sequence for the training framework
  Identifying and sorting relevant sequence of SceneMarks from multiple cameras
    Creating a list of SceneMarks by referencing SceneMarks that have resulted in generating a SceneMark
    Filtering SceneMarks that have no relation to other SceneMarks
  Build summary of events
    Constructing a summary SceneMark that reference SceneMarks that are relevant to the event
  Using the sequence of SceneMarks to accumulate pattern
    Analyzing the linkage between SceneMarks to construct and improve the Tube Map
  Using accumulated chain of SceneMarks in training framework
    Using the linkage of SceneMarks to train an AI model that can predict future SceneMarks or identify categories of events Although the detailed description contains many specifics, these should not be construed as limiting the scope of the invention but merely as illustrating different examples. It should be appreciated that the scope of the disclosure includes other embodiments not discussed in detail above. Various other modifications, changes and variations which will be apparent to those skilled in the art may be made in the arrangement, operation and details of the method and apparatus disclosed herein without departing from the spirit and scope as defined in the appended claims. Therefore, the scope of the invention should be determined by the appended claims and their legal equivalents.

Alternate embodiments are implemented in computer hardware, firmware, software, and/or combinations thereof. Implementations can be implemented in a computer program product tangibly embodied in a computer-readable storage device for execution by a programmable processor; and method steps can be performed by a programmable processor executing a program of instructions to perform functions by operating on input data and generating output. Embodiments can be implemented advantageously in one or more computer programs that are executable on a programmable computer system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits), FPGAs and other forms of hardware.

Section X: Description of Data Objects

This Section X describes example implementations of the following data objects:
  Capabilities
  SceneMode
  SceneMark
  SceneData These data objects may be used to facilitate image understanding. Image understanding are higher level functions used to understand the content of images. One example is the detection of the presence or absence of a specific object: the detection of faces, of humans, of animals or certain types of animals, of vehicles, of weapons, of man-made structures or certain type of structures, or of texts or logos or bar codes. A higher level example is the identification (i.e., recognition) of specific objects: the identification of a terrorist in a crowd, the identification of individuals by name, the identification of logos by company, the identification of an individual against a passport or driver's license or other credential. An even higher level example of image understanding are further characterizations based on the detection or identification of specific objects. For example, a face may be detected and then analyzed to understand the emotion expressed. Other examples of image understanding include the detection and identification of specific actions or activities, and of specific locations or environments. More complex forms of image understanding may be based on machine learning, deep learning and/or artificial intelligence techniques that require significant computing resources. The results of image understanding may be captured in metadata, referred to as image understanding metadata or contextual metadata. They may be packaged as SceneMarks described below.

Capabilities Object

The Capabilities object defines Processing, Transducers and Ports that the Node is capable of providing. The Capabilities data structure describes the available processing, capture (input) and output of images, audio, sources of data and outputs of data that are supported by a Node. These may include the following.

1. Transducer: A Transducer is either a sensor or an actuator which can convert data into a physical disturbance (for example a speaker). The following are examples of Transducers:

Image sensor (image, depth, or temperature camera) typically outputs a two-dimensional array that represents a frame.
  Data sensor (humidity sensor, temperature sensor, etc.) typically outputs a text or data structure.
  Audio microphone typically produces a continuous sequence of audio samples.
  Speaker takes as an input a sequence of audio samples and outputs audio.

2. SceneModes supported: These are defined modes for analyzing images. See also the SceneMode object below.

3. Audio processing: This may be defined by the Node. It includes the function of speech to text.

4. Custom Analysis: This allows the user to define custom analysis. As one example, it may be an algorithm that can process an audio, image or video input and generate a vector of scores whose meaning is defined by the algorithm.

5. Input: This may be SceneData or SceneMarks and may be in a processed or unprocessed form. The following may be sources for the process:

Output of a sensor internal or external to the device.
  Output of a Node on a different device.
  Output of a different Node within the same device.

6. Output: An output may be SceneData or SceneMarks and may also be in a processed or unprocessed form.

SceneMode Object

The SceneMode determines the data to be generated. It defines which type of data is to be prioritized by the capture of frames and the processing of the captured frames. It also defines the SceneMarks that are generated and the trigger conditions for generating the SceneMarks.

For example the Face SceneMode will prioritize the capture of faces within a sequence of frames. When a face is detected, the camera system will capture frames with the faces present where the face is correctly focused, illuminated and, where necessary, sufficiently zoomed to enable facial recognition to be executed with increased chance of success. When more than one face is detected, the camera may capture as many faces as possible correctly. The camera may use multiple frames with different settings optimized for the faces in view. For example, for faces close to the camera, the camera is focused close. For faces further away, digital zoom and longer focus is used.

The following SceneModes may be defined:
Face
Human
Animal
Text/Logo/Barcode
Vehicle
Object Label. This is a generalized labeling of images captured by the camera.
Custom. This is user defined.

The SceneMode may generate data fields in the SceneMark associated with other SceneModes. The purpose of the SceneMode is guide the capture of images to suit the mode and define a workflow for generating the data as defined by the SceneMode. At the application level, the application need not have insight into the specific configuration of the devices and how the devices are capturing images. The application uses the SceneMode to indicate which types of data the application is interested in and are of highest priority to the application.

Trigger Condition

A SceneMode typically will have one or more "Triggers." A Trigger is a condition upon which a SceneMark is generated and the SceneData defined for the SceneMode is captured and processed. The application can determine when a SceneMark should be generated.

In one approach, Triggers are based on a multi-level model of image understanding.

The Analysis Levels are the following:

1. Motion Detected: The Process is capable of detecting motion within the field of view.

2. Item Detected or Item Disappeared: The Process is capable of detecting the item associated with the SceneMode (Item Detected) or detecting when the item is no longer present (Item Disappeared). For example in the case of SceneMode=Face, Item Detected means that a Face has been detected. In the case of SceneMode=Animal, Item Disappeared means a previously detected animal is no longer present.

3. Item Recognized: The Process is capable of identifying the detected item. For example in the case of the SceneMode=Label, "Recognized" means a detected item can be labelled. In the case of SceneMode=Face, "Recognized" means that the identity of the face can be determined. In one version, the SceneMode configuration supports recognition of objects based on reference images for the object.

4. Item Characterized: The Process is capable of determining a higher-level characteristic for the item. For example in Scene Mode=Face, "Characterized" means that some feature of the detected face has had an attribute associated with it. For example, a mood or emotion has been attributed to the detected face.

The SceneMode defines the Analysis Level required to trigger the generation of a SceneMark. For example, for SceneMode=Face, the Trigger Condition may be Face Detected, or Face Recognized, or Face Characterized for Emotion. Similar options are available for the other SceneModes listed above.

SceneMark Object

A SceneMark is a compact representation of a recognized event or Scene of interest based on image understanding of the time- and/or location-correlated aggregated events. SceneMarks may be used to extract and present information pertinent to consumers of the sensor data. SceneMarks may also be used to facilitate the intelligent and efficient archival/retrieval of detailed information, including the raw sensor data. In this role, SceneMarks operate as an index into a much larger volume of sensor data.

SceneMark objects include the following:
SceneMark identifier
Timestamp
Image understanding metadata
Reference to corresponding SceneData When the analysis engines encounter Trigger Conditions, a SceneMark is produced. It provides a reference to the SceneData and metadata for the Trigger Condition. The completeness of the SceneMark is determined by the analysis capabilities of the Node. If the Node can only perform motion detection when higher level analysis is ultimately desired, a partial SceneMark may be generated. The partial SceneMark may then be completed by subsequent processing Nodes.

SceneData Object

SceneData is captured or provided by a group of one or more sensor devices and/or sensor modules, which includes different types of sensor data related to the Scene. SceneData is not limited to the raw captured data, but may also include some further processing. Examples include:
RGB image data
IR image data
RGB IR image data
Depth map
Stereo image data
Audio
Temperature
Humidity
Carbon Monoxide
Passive Infrared The SceneMode defines the type and amount of SceneData that is generated when the Trigger that is associated with the SceneMode is triggered. For example the SceneMode configuration may indicate that 10 seconds of video before the Trigger and 30 seconds after the Trigger is generated as SceneData. This is set in the SceneData configuration field of the SceneMode data object. Multiple SceneMarks may reference a single video file of SceneData if Triggers happen more rapidly than the period defined for SceneData. For example where multiple Triggers occur within 30 seconds and the SceneData is defined for each Trigger is 30 seconds. Where multiple Triggers occur within those 30 seconds, the SceneMarks generated for each Trigger reference the same video file that makes up the SceneData for the Trigger.

What is claimed is:

1. A method implemented on nodes of a multi-layer technology stack to develop contextual understanding of related events detected by the nodes, the method comprising:
sensor nodes capturing sensor data, including multiple image sensors capturing images;
a plurality of nodes receiving sensor data and/or metadata packages from other nodes, analyzing the received data for events, and generating and/or augmenting metadata packages describing detected events; wherein the analysis for at least some of the nodes includes image understanding, the image understanding analysis comprises use of artificial intelligence (AI) models, and the AI models are dynamically loaded onto nodes;
identifying events that are related, based on the metadata packages describing the events; and
developing a contextual understanding of the related events, based at least in part on analysis of the metadata packages describing the events.

2. The method of claim 1 wherein the multi-layer technology stack comprises a sensor layer that includes the sensor nodes, a device layer, and a cloud layer; with interfaces between the layers for transfer of sensor data and/or metadata packages between the layers.

3. The method of claim 1 wherein developing the contextual understanding of the related events is also based on analysis of images captured by the sensor nodes.

4. The method of claim 1 wherein the AI models are conditionally loaded onto nodes, based on whether certain events are detected.

5. The method of claim 1 wherein a third party service distributes AI models to nodes.

6. The method of claim 1 wherein AI models are distributed peer-to-peer between nodes.

7. The method of claim 1 wherein identifying events that are related is further based on a proximity of the sensor nodes capturing the sensor data associated with the metadata packages.

8. The method of claim 7 wherein identifying events that are related is further based on expected delays between same events captured by different sensor nodes that are in proximity to each other.

9. The method of claim 7 wherein identifying events that are related is further based on probabilities of same events being captured by different sensor nodes that are in proximity to each other.

10. The method of claim 7 wherein identifying events that are related comprises a receiving node determining whether events are related based on the metadata packages received by the receiving node.

11. The method of claim 1 wherein metadata packages include object-specific attributes describing attributes of objects present in corresponding sensor data.

12. The method of claim 11 wherein developing the contextual understanding of related events comprises:
receiving a plurality of metadata packages from different nodes and derived from different sensor data; and
analyzing the plurality of metadata packages to develop a higher-level understanding than in the plurality of metadata packages; and
generating a metadata package that contains the higher-level understanding.

13. A method implemented on nodes of a multi-layer technology stack to develop contextual understanding of related events detected by the nodes, the method comprising:
sensor nodes capturing sensor data, including multiple image sensors capturing images;
a plurality of nodes receiving sensor data and/or metadata packages from other nodes, analyzing the received data for events, and generating and/or augmenting metadata packages describing detected events; wherein the analysis for at least some of the nodes includes image understanding;
identifying events that are related, based on the metadata packages describing the events; wherein the nodes are organized in a hierarchy, and identifying events that are related is further based on a hierarchical relationship of nodes producing metadata packages; and
developing a contextual understanding of the related events, based at least in part on analysis of the metadata packages describing the events.

14. The method of claim 13 wherein the hierarchy is based on a proximity of the nodes.

15. The method of claim 13 wherein a third party service coordinate the nodes.

16. A method implemented on nodes of a multi-layer technology stack to develop contextual understanding of related events detected by the nodes, the method comprising:
- sensor nodes capturing sensor data, including multiple image sensors capturing images;
- a plurality of nodes receiving sensor data and/or metadata packages from other nodes, analyzing the received data for events, and generating and/or augmenting metadata packages describing detected events; wherein the analysis for at least some of the nodes includes image understanding;
- identifying events that are related, based on the metadata packages describing the events; and
- developing a contextual understanding of the related events, based at least in part on analysis of the metadata packages describing the events; wherein developing the contextual understanding of related events comprises:
  - receiving a plurality of metadata packages from different nodes and derived from different sensor data;
  - analyzing the plurality of metadata packages to develop a higher-level understanding than in the plurality of metadata packages; and
  - generating a metadata package that contains the higher-level understanding and also contains references to the plurality of metadata packages that were analyzed to develop the higher-level understanding.

17. The method of claim 16 wherein the image understanding analysis comprises use of artificial intelligence (AI) models.

18. The method of claim 16 wherein the multi-layer technology stack comprises a sensor layer that includes the sensor nodes, a device layer, and a cloud layer; with interfaces between the layers for transfer of sensor data and/or metadata packages between the layers; and the image understanding analysis comprises use of artificial intelligence (AI) models.

19. A method implemented on nodes of a multi-layer technology stack to develop contextual understanding of related events detected by the nodes, the method comprising:
- sensor nodes capturing sensor data, including multiple image sensors capturing images;
- a plurality of nodes receiving sensor data and/or metadata packages from other nodes, analyzing the received data for events, and generating and/or augmenting metadata packages describing detected events; wherein the analysis for at least some of the nodes includes image understanding;
- identifying events that are related, based on the metadata packages describing the events; and
- developing a contextual understanding of the related events, based at least in part on analysis of the metadata packages describing the events; wherein developing the contextual understanding of related events comprises:
  - receiving a plurality of metadata packages from different nodes and derived from different sensor data;
  - analyzing the plurality of metadata packages to develop a higher-level understanding than in the plurality of metadata packages; and
  - generating a metadata package that contains the higher-level understanding, wherein the higher-level understanding in the generated metadata package comprises a summary of events described in the plurality of metadata packages.

20. The method of claim 19 wherein the multi-layer technology stack comprises a sensor layer that includes the sensor nodes, a device layer, and a cloud layer; with interfaces between the layers for transfer of sensor data and/or metadata packages between the layers; and the image understanding analysis comprises use of artificial intelligence (AI) models.

* * * * *